United States Patent
Klein et al.

(10) Patent No.: US 6,714,969 B1
(45) Date of Patent: Mar. 30, 2004

(54) MOBILE TERMINAL WITH INTEGRATED HOST APPLICATION SOFTWARE

(75) Inventors: John Klein, Morgan Hill, CA (US); Allan Herrod, Farmingville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/570,961

(22) Filed: May 15, 2000

Related U.S. Application Data

(62) Division of application No. 09/520,929, filed on Mar. 8, 2000, now Pat. No. 6,507,864, which is a continuation of application No. 08/916,605, filed on Aug. 22, 1997, now abandoned, which is a continuation of application No. 08/691,263, filed on Aug. 2, 1996, now abandoned.

(60) Provisional application No. 60/006,872, filed on Nov. 17, 1995.

(51) Int. Cl.[7] ............................ G06F 15/16; G06F 13/12
(52) U.S. Cl. ........................... 709/219; 709/201; 710/73
(58) Field of Search ................................. 709/201, 219; 710/73, 5, 10; 345/168; 348/76

(56) References Cited

U.S. PATENT DOCUMENTS

| | | | |
|---|---|---|---|
| 5,664,231 A | 9/1997 | Postman et al. | 395/893 |
| 5,717,737 A | 2/1998 | Doviak et al. | 379/58 |
| 5,821,512 A | 10/1998 | O'Hagan et al. | 235/383 |
| 5,905,248 A * | 5/1999 | Russell et al. | 235/462.15 |
| 5,978,773 A | 11/1999 | Hudetz et al. | 705/23 |
| 5,987,611 A | 11/1999 | Freund | 713/201 |
| 6,003,007 A * | 12/1999 | DiRienzo | 705/4 |
| 6,012,102 A | 1/2000 | Shachar | 710/5 |
| 6,041,374 A | 3/2000 | Postman et al. | 710/73 |
| 6,049,796 A * | 4/2000 | Siitonen et al. | 707/3 |
| 6,094,689 A | 7/2000 | Embry et al. | 710/5 |
| 6,119,935 A | 9/2000 | Jelen et al. | 235/383 |
| 6,129,276 A | 10/2000 | Jelen et al. | 235/383 |
| 6,134,406 A | 10/2000 | Moe et al. | 399/165 |
| 6,144,848 A | 11/2000 | Walsh et al. | 455/419 |
| 6,304,898 B1 * | 10/2001 | Shiigi | 709/206 |
| 6,308,205 B1 * | 10/2001 | Carcerano et al. | 709/221 |
| 6,321,992 B1 * | 11/2001 | Knowles et al. | 235/462.01 |
| 6,336,137 B1 * | 1/2002 | Lee et al. | 709/219 |
| 6,356,905 B1 * | 3/2002 | Gershman et al. | 707/10 |
| 6,430,624 B1 * | 8/2002 | Jamtgaard et al. | 709/246 |
| 6,453,361 B1 * | 9/2002 | Morris | 709/250 |
| 6,466,783 B2 * | 10/2002 | Dahm et al. | 455/414 |
| 6,535,913 B2 * | 3/2003 | Mittal et al. | 709/219 |

FOREIGN PATENT DOCUMENTS

EP   0744856   11/1996

* cited by examiner

Primary Examiner—Krisna Lim
(74) Attorney, Agent, or Firm—Amin & Turocy, LLP

(57) ABSTRACT

A method of integrating host application software with data collection devices (e.g., bar code scanners) located on remote, wireless terminals. A data collection object executes on the host computer, using a predetermined interface between the host application software and the data collection object. That interface, and the communications between the host application software and the data collection object, are configured so that to the host application software the data collection device appears to be local hardware on the host computer. The data collection object creates and executes threads of execution for controlling operation of the data collection device, with the threads communicating with the remote terminals via a host computer transport layer, the wireless link, and a remote computer transport layer at the remote terminals. A data collection device driver on the remote terminal receives communications from the data collection object, and returns information to the data collection object, over the remote computer transport layer, wireless link, and host computer transport layer.

35 Claims, 14 Drawing Sheets

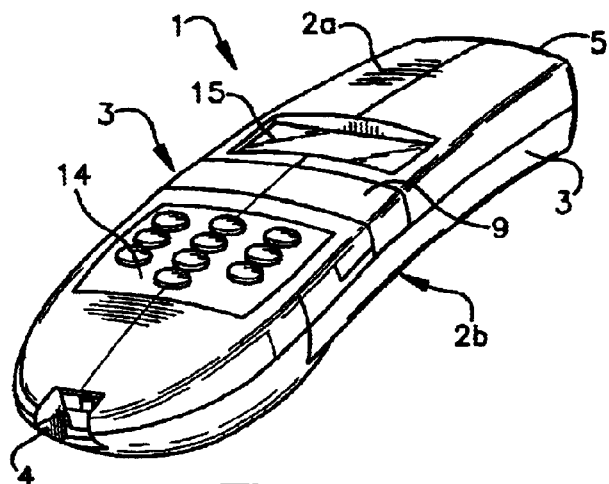
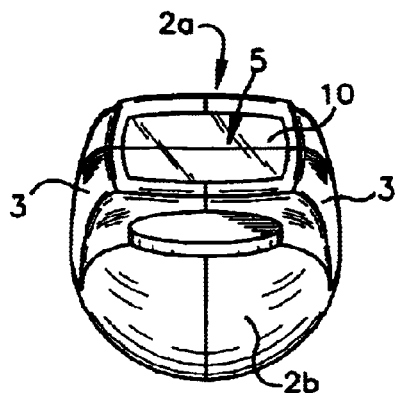
Fig.1
Fig.3
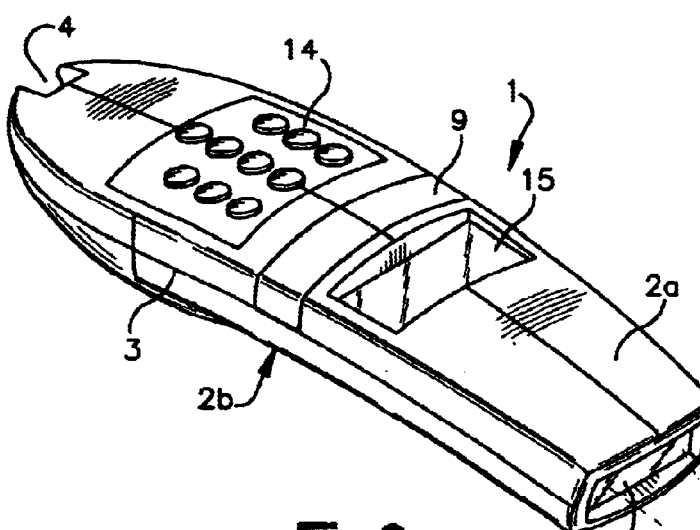
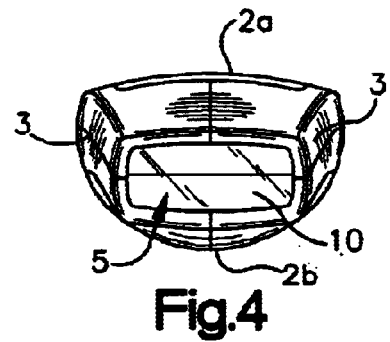
Fig.2
Fig.4

MOBILE TERMINAL WITH INTEGRATED HOST APPLICATION SOFTWARE

CROSS REFERENCE TO RELATED APPLICATIONS

This application is a divisional of appln Ser. No. 09/520,929 filed Mar. 8, 2000, now U.S. Pat. No. 6,507,864 issued on Jan. 14, 2003, which is a continuation of U.S. application Ser. No. 08/916,605, filed Aug. 22, 1997 now abandoned (hereby incorporated by reference), which is a continuation of U.S. patent application Ser. No. 08/691,263, filed on Aug. 2, 1996, now abandoned, which was copending with U.S. Provisional Application No. 60/006,872 filed on Nov. 17, 1995. U.S. patent application No. 09/359,019, filed Jul. 22, 1999 is also a divisional of U.S. patent application Ser. No. 08/916,605.

BACKGROUND OF THE INVENTION

The invention relates to integrating host application software with data collection devices (e.g., bar code scanners) located on remote, wireless terminals.

Various readers and optical scanning systems have been developed for reading printed indicia such as bar code symbols appearing on a label or the surface of an article and providing information concerning the article such as the price or nature of the article. The bar code symbol itself is a coded pattern of indicia comprised of, for example, a series of bars of various widths spaced apart from one another to form spaces of various widths, the bars and spaces having different light reflecting characteristics. The readers electro-optically transform the graphic indicia into electrical signals which are decoded into alpha-numeric characters that are intended to be descriptive of the article or a characteristic thereof. Such characters typically are represented in digital form, and utilized as an input to a data processing system for applications in point of sale processing, inventory control and the like.

Known scanning systems comprise a light source for generating a light beam incident on a bar code symbol and a light receiver for receiving the reflected light and decoding and information contained in the bar code symbol accordingly. The readers may comprise a flying spot scanning system wherein the light beam is scanned rapidly across a bar code symbol to be read or a fixed field of view reading system wherein the bar code symbol to be read is illuminated as a whole and a CCD (Charge Coupled Device) array is provided for detecting the light reflected from the bar code symbol.

Known hand-held optical readers are often in the shape of a gun having a handle portion and a barrel portion. The reading window through which the light beam passes is generally located at the end face of the barrel portion, and the reader is aimed at the indicia to be read by the operator holding the handle portion. A trigger is situated in the region of the junction between the handle portion and the barrel portion for operation by the user to actuate the optical reader.

In addition there are known portable hand-held computers for collecting data and down-loading the data to a central or peripheral device. The down-loaded data may be raw data or data that has been processed within the hand-held computer. Data collection can be carried out by entering information to the hand-held computer via a keypad, or by incorporating in the computer an optical reader for example for reading bar code symbols, or incorporating a reader for reading a magnetic card strip. For example when information about various products is required during inventorying, those products may bear bar code symbols or magnetic strips, or have associated magnetic strip cards which are read by the hand-held computer. The data collected can be transferred from the hand-held computer to a central or peripheral device by known means such as radio frequency radio links, wired connections, infra-red communications or other known transmission arrangements.

Often, more than one data capture system is required for a given application. The manufacture of a customized system for a specific application is expensive and difficult to modify if it is subsequently desired to incorporate further data capture options than those originally provided in the customized device.

Further limitations are imposed because of the limited storage capability of hand-held computers (often known as personal digital assistants) as a result of which simple-store-and-forward, multi-user electronic message systems are generally impractical.

It has been previously proposed to implement a bar code scanner resident on a control machine running a COMPONENT OBJECT MODEL (COM) object. It is desired to increase the scope of such applications to be compatible with a wide range of models and in particular to introduce a bar code scanner remote from the machine and controlled through a wireless interface.

SUMMARY OF THE INVENTION

In general, the invention features a new method of integrating host application software with data collection devices (e.g., bar code scanners) located on remote, wireless terminals. A data collection object executes on the host computer, using a predetermined interface between the host application software and the data collection object. That interface, and the communications between the host application software and the data collection object, are configured so that to the host application software the data collection device appears to be local hardware on the host computer. The data collection object creates and executes threads of execution for controlling operation of the data collection device, with the threads communicating with the remote terminals via a host computer transport layer, the wireless link, and a remote computer transport layer at the remote terminals. A data collection device driver on the remote terminal receives communications from the data collection object, and returns information to the data collection object, over the remote computer transport layer, wireless link, and host computer transport layer.

In preferred implementations of the invention, one or more of the following features may be included:

The data collection object may be implemented as a COM.

Communications between the remote terminal and the host computer may be over an Internet or Intranet network.

The data collection device may be a bar code scanner, and the data collection object may be a bar code scanning object.

There may be provided a portable computer device comprising a main body and at least one data collection/communications module connectable to the main body, the main body including an interface for connection with the module, a processor for processing information received from the module and a communication link for exchanging information with a host. Because of the modular arrangement the device may be easily adapted to different applications without the requirement to manufacture costly customized systems or to modify such systems which would prove expensive and complex.

The main body may include a visual display, for example an LCD display. The main body may also comprise a keypad. The modules may comprise an image capture module, a laser scanner module and/or a multi-media module. The modules preferably include digital signal processing sub-systems which may be of a single design and programmable as appropriate. The modules may comprise pre-processors for pre-processing information prior to transfer to the main body to reduce the burden on the processor in the main body. The module may be movably mounted on or relative to the main body, and in particular to the display on the main body—for example it may be hinged pivotally or rotatably mounted.

The device may be configured for connection with the Internet.

According to the invention there is provided a communication system for a bar code scanner comprising a control host, a scanning control object working therein and a remote client associated with the bar code scanner wherein the scanning control object communicates with the remote client to control the bar code scanner and the scanning control object is implemented as an OLE control. Accordingly there is provided a system capable of seamless communication between the scanning control and the remote client.

The host and the scanning object control may communicate and integrate via interfaces. The scanning control object may create separate threads of execution for controlling communication with the remote client. The separate threads of execution may include send, receive and synchronize bar code scanner transaction commands.

The scanning control object may be arranged to communicate with the remote client over an Internet or Intranet link and/or by wireless communication.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which:

FIG. 1 is a perspective view of an optical reader according to the present invention from above and the rear;

FIG. 2 is a perspective view of the optical reader of FIG. 1 from above and the front;

FIG. 3 is a perspective view of the optical reader from the front and tilted upwardly;

FIG. 4 is a view of the optical reader from the front;

DETAILED DESCRIPTION OF THE PREFERRED EMBODIMENTS

Throughout the description of the optical reader the terms "front", "rear", "upper", "above", "lower" and "below" are used consistently. Referring, for example, to FIGS. 1 to 4 the optical reader has a rear end 4 and a generally planar front end 5, an upper face 2a and opposed to that a lower face 2b.

Figure 6:
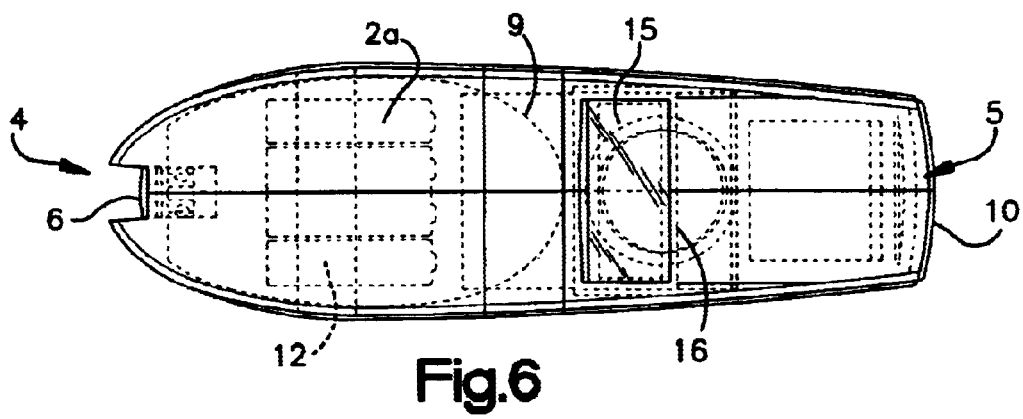
FIG. 6 is a view of the optical reader from above showing hidden detail.

Referring to FIGS. 1 to 4 in more detail the optical reader includes a generally bar-shaped elongate housing indicated generally by the reference numeral 1, having two generally opposed long broad upper and lower faces 2a, 2b (see also FIG. 7), two generally opposed long, shallow side faces 3, a rear end 4 and a front end 5 (see also FIG. 6).

Figure 5:
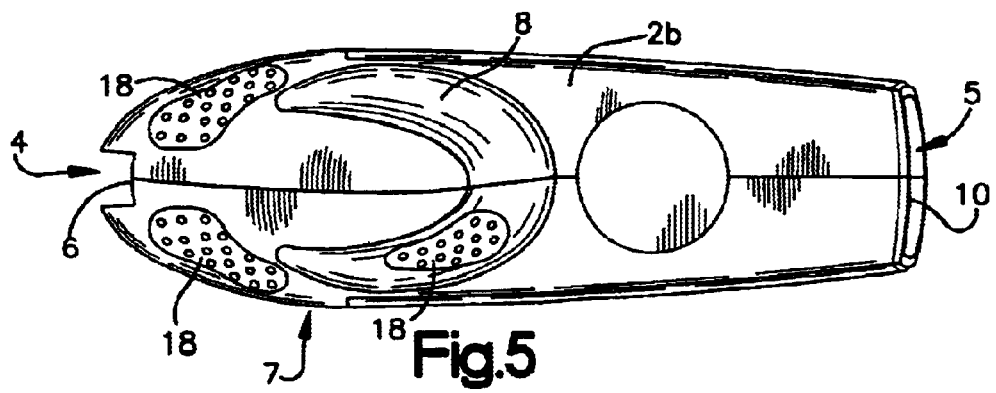
FIG. 5 is a view of the optical reader from below.

As can be seen from FIGS. 5 and 6, the upper and lower faces 2a, 2b of the reader comprise side edges having substantially straight front portions tapering inwardly towards the front edge which is of convex shape having a large radius of curvature. The rear portions of the side edges curve inwardly and meet so that the rear end 4 of the housing is generally elliptical in shape when viewed from above. The rear end is interrupted by a recessed connector 6 which is described in more detail below. The housing is configured to be held by a user with the rear end mounted in the palm of the user and it will be seen, therefore, that the curved end of the housing when viewed from above will facilitate holding by the user.

Figure 7:
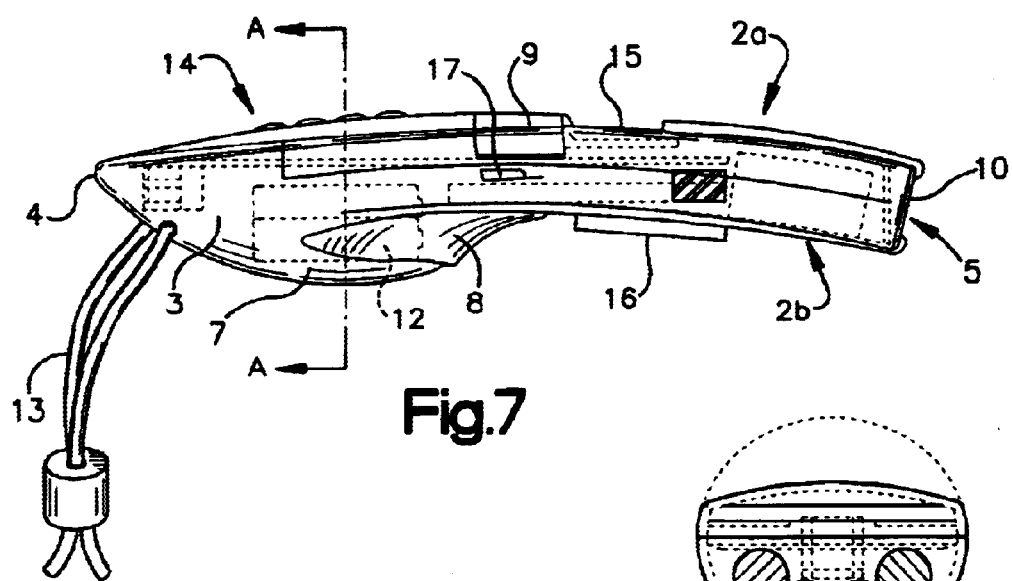
FIG. 7 is a side view of the optical reader showing hidden detail.

Referring to FIG. 7 the side faces 3 of the housing comprise substantially parallel downwardly curved long edges and a substantially straight front edge. A bulbous convex rear portion 7 extends from the rear end of the upper face to approximately the centre of the lower edge. A concave groove 8 is provided in the frontward part of the bulbous portion 7 extending around both sides of the bulbous portion 7 to approximately the mid point of the bulbous portion 7 on either side. As a result the reader is yet more suitable to be gripped towards the rearward end by the operator, the bulbous portion 7 fitting into the palm of the operator and the concave groove providing improved grip and fit with the operator's hand.

A reading arrangement is mounted within the housing. The reading arrangement may be any known conventional arrangement, for example a "flying spot" optical scanner or a "field of view" optical reader. Generally the arrangement will include a light generating source such as a laser diode, a beam focusing or directing arrangement and a light receiving device. Where the reading arrangement is an optical scanner a rapidly oscillatable scan component, such as a mirror is provided to scan the light beam across an indicia to be read. Alternatively, the laser diode itself can be oscillated. Where the reader is a field of view optical reader a charge coupled device (CCD) array, or a photodetector arrangement is provided to detect the reflected light beam.

In order to actuate the reading arrangement a scan trigger 9 is provided on the upper surface 2a of the housing 1. In the arrangement shown the trigger 9 comprises a cut-out strip extending transverse to the longitudinal axis of the housing 1 and across the whole of the upper face and part of each of the side faces 3 and is situated approximately half way along the upper face 2a. The trigger 9 is activated by depression and is positioned along the housing 1 such that it is easily actuable by the operator when the reader is held in the operator's hand. The trigger mechanism itself may be of any known arrangement; for example the trigger may be spring-loaded and have contacts which form a circuit with contacts within the housing when the trigger is depressed to actuate the reading arrangement. Power may therefore be conserved as the reader will only be activated when the trigger is depressed enabling the operator to leave the reader idle when no indicia are to be read. Once again, as the trigger is positioned with ergonomic considerations in mind, the reader can be simply and quickly operated by the user with minimum discomfort.

A scanning window 10 is positioned on the front face 5 of the reader. Light generated by the reading arrangement passes through the window 10 and is reflected and scattered back through the window 10 by a bar code symbol 11. Accordingly the reader can be easily and accurately aimed at the bar code symbol 11 to be read (as shown illustratively in FIG. 2). As a result the bar code symbol 11 can be rapidly located by the user and read by the reader with a minimum amount of time wasted attempting to locate the bar code symbol 11. Accordingly both operator time and usage time can be reduced which is of particular relevance in battery-powered hand-held readers.

Figure 8:
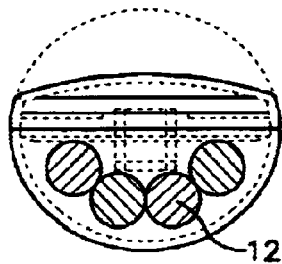
FIG. 8 is a sectional view of the optical reader along the line A—A shown in FIG. 7.

As shown in FIGS. 6, 7 and 8, the batteries 12 for the hand-held reader are stored in the bulbous portion 7 towards the rear and aligned with the longitudinal axis of the reader. The batteries 12 are disposed along a curved surface matching the curvature of the bulbous portion. As a result, maximum use is made of the ergonomically design bulbous portion 7 of the reader and minimum space is occupied by the batteries 12.

A strap 13 can be attached to the reader, for example towards the rear of the bulbous portion 7 for placing around the operator's wrist such that, in the event of the reader being inadvertently released from the grip of the user, it is still held to the user by the strap 13.

Also provided on the upper face of the reader are a keypad 14 and a display 15. (The keypad 14 is not shown in FIG. 6 for the purpose of clarity). The keypad 14 may be used to initialize the reading arrangement such that identification information concerning the user is entered into the system. Alternatively, the keypad 14 may be used to enter predetermined codes or information concerning modes of operation of the reader or to carry out cancellation or manipulation operations on information provided by the reader. The display 15 may display information relating to the mode of operation of the reader, or display check information relating to the item carrying the bar code symbol being read together with background information such as the time, date, and confirmation of the operator's identity. Preferably the display 15 is a liquid crystal display (LCD).

The reading arrangement can process information derived from the bar code symbols directly or can send raw data to an external processing device which can then process the information accordingly. In addition, information derived by the reader from bar code symbols can be transferred to a memory device in order that a database of information can be built up. For example where the reader is used at a point of sale, buying patterns can be stored and analyzed. Alternatively, if the reader is being used for inventorying purposes then the inventory information can be stored. The optical reader can transmit information in a variety of manners. In the embodiments shown various different transmitting devices are provided; in practice only one or more of the devices need be provided depending on the particular use to which the reader is to be put. For example the information may be transmitted by an acoustic modem 16. In that case, information can be stored in a buffer memory within the reader and then down-loaded by the acoustic modem 16 at predetermined intervals. The display 15 could indicate when information was to be down-loaded. Alternatively an interface connector, for example an RS41 connector is designated by reference numeral 6 and provided at the rear of the reader. Suitable cabling can be inserted into the connector 6 to down-load information or alternatively to load data into the reader for example relating to the mode of operation. Once again, the display 15 could provide an indication of the functioning of the connector. The cable could be permanently connected to the reader as the connector 6 is provided at the rear of the reader and hence would not be obscured by the user's hand. Alternatively, the connector 6 could be connected to a cable for loading or down-loading of information when required and, for example, when indicated by display 15. In addition, a radio 17 or other transmitting device can be provided within the housing 1 to allow real time data communication. An advantage of that arrangement is that the operator may use the reader in a "cordless" or "wireless" configuration allowing increased mobility. Once again the radio 17 could comprise a transmitter and a receiver in order that information can be sent to and from a remote processor. The radio link could be replaced by an infra-red communication link or other wireless link of known type. Because the reader is of ergonomic design, the transfer of information is easily carried out while the reader is actually in use, if required.

As a further option the reader may be configured for connection to a telecommunications network or computer network, for example the "Internet".

One example of where the reader may be of particular use is in relation to the worldwide web. When it is desired to access a web site it is necessary to enter the address of the site, known as the universal resource locator (URL). Often those URL's are long and complex, and are time consuming to enter and check manually. Furthermore the URL can, despite many checks, still give rise to error. The problem is exacerbated in the case of computer illiterate users. The proposed manner of overcoming this problem is to encode the URL address in a bar code symbol and read the bar code symbol with the reader for automatic access to the corresponding web site, which will be quick and accurate, giving rise to far less margin for error. The reader may be used to interface with a terminal for entry of the URL address or could be used independently.

In order to improve the operator's grip on the reader, one or more finger grips may be provided at locations where, in use, the operator's fingers or other parts of the operator's hand would contact the reader. The finger grip would comprise a molded rubber portion having raised elements to achieve traction on the finger or palm. Such finger grips could be provided, for example, on the bulbous portion 7 (as shown schematically in FIG. 5 by reference numeral 18) or the concave groove 8 therein, on or in the vicinity of the trigger portion or in areas of the upper surface 2a where the operator's thumb might rest.

Accordingly, it will be seen that the hand-held optical reader described herein is ergonomically shaped for maximum user ease and comfort, allowing increased efficiency and user-friendliness. Features such as the trigger 9 and finger grips 18 are positioned for optimum user operability. It will be appreciated that such features may be presented symmetrically in order to allow the terminal to be used by either left or right-handed users, or alternatively the handset may be produced in both left and right-handed versions. The reading window 10 is positioned for improved accuracy and ease of use, and features such as the key pad 14 and display 15 are positioned for ease of access and reference by the user. The device may be either wireless or connected to a central processor by a cord leading from the connector 6 provided at a convenient position on the terminal. The device can be powered by batteries 12 located conveniently along the curve of the bulbous grip portion 7 or could in the alternative be powered by a removable, rechargeable battery pack or via a cord into the above-mentioned interconnector or another connector.

Figure 9:
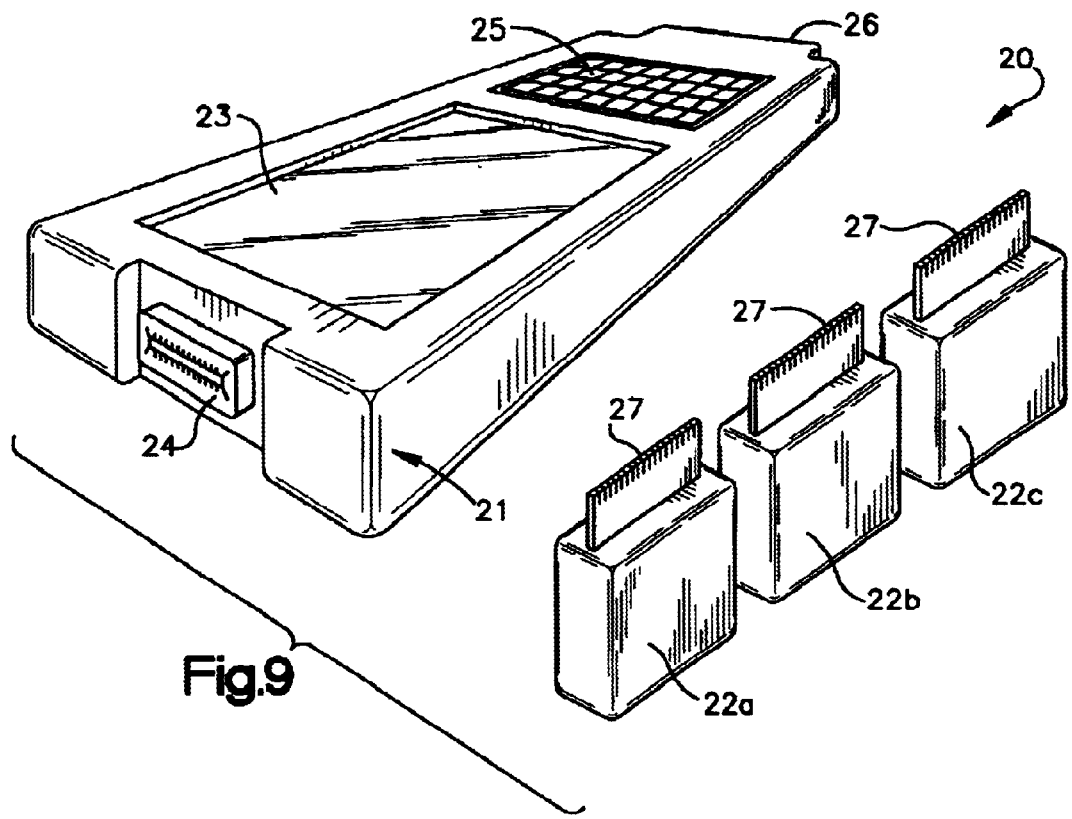
FIG. 9 shows a portable computer device according to another aspect of the invention.

According to another aspect there is shown in FIG. 9 a data collection device comprising an improvement over known arrangements. The device comprises a portable hand-held computer for collecting data and down-loading the raw processed data to a central or peripheral device. The device, designated generally as 20 comprises a main body 21 and interchangeable data collection modules 22a, 22b, 22c.

The main body 21 is provided internally with data processing means (not shown) and also comprises a display screen 23, for example an LCD display screen capable of displaying video images, a data collection module interface 24, an optional input information keypad 25 and a communication link 26 which may comprise radio frequency or infra-red transmitting means or an interface for down-loading information to a central or peripheral device via a physical cable. It will be appreciated that the LCD display 23 and input keypad 25 are optional features. Advantageously, however, they allow the user to configure operation of the device as a whole quickly and simply and monitor the operation. The main body is shown schematically in FIG. 9; in practice it could assume an ergonomic shape such as that shown in FIGS. 1 to 7, suitable interfaces etc. being positioned as appropriate, for example at respective ends of the module.

It will be appreciated that the device may transfer information to a host via any electronic data transfer scheme—for example the system could also use cellular-based telephone channels.

Alternatively the device could be configured for connection to a telecommunications network or computer network, for example the "Internet".

The data collection modules are interchangeable with one another and may be, for example, CCD (Charge Coupled Device) based image, video and bar code symbol data capture modules, audio transducers for collecting and receiving sound information, laser image scanners or combined multi-media data collection modules.

An image capture module using a CCD could be used for capturing images of objects for storage or use by a processor application carried out by the main body or by a host, such images including for example people, landscapes, homes and vehicles for reference applications. In addition the imager could be used for one dimensional or two dimensional bar code symbols for decoding data capture. A laser optical reader scanning module and decoder would be used generally for bar code data capture and decoding only.

Figure 11:
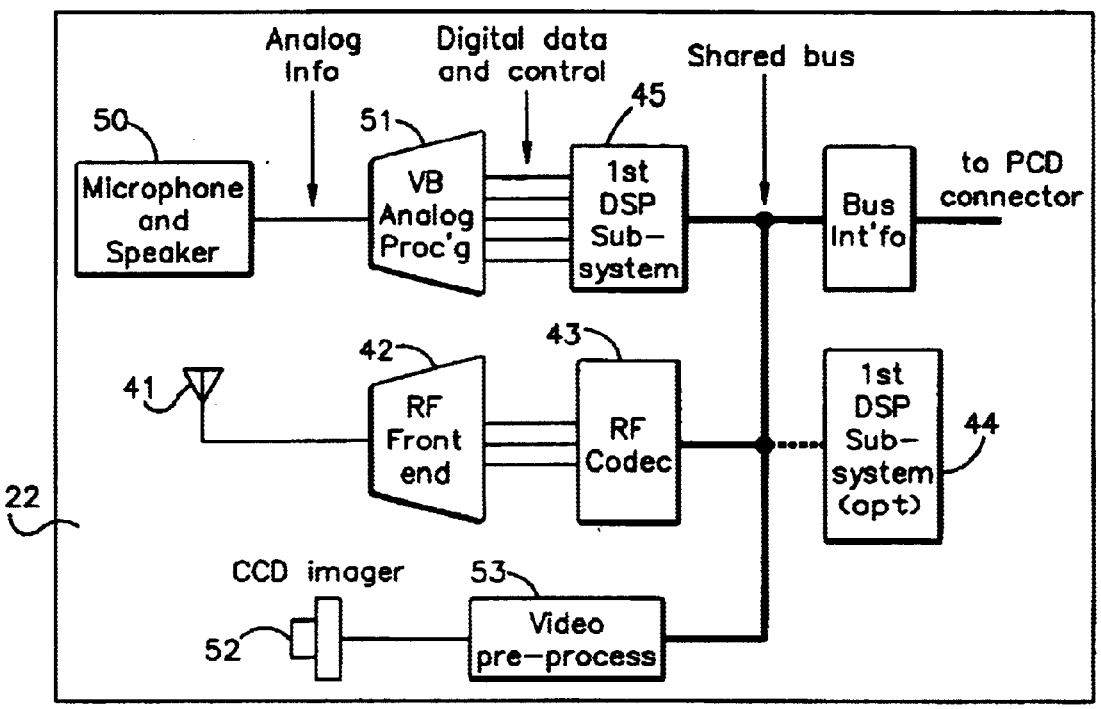
FIG. 11 is a block diagram of a multi-media module for the device of FIG. 9.

A multi-media module 22 is shown in FIG. 11 and discussed in more detail with reference to that figure below. Such a module could contain a circuitry for image/video capture, audio capture and playback and a cellular telephony sub-system. Such a module would be of particular use in tele-conferencing and live video communications over cellular networks from the portable unit.

The desired data collection module 22a,b,c is connected to the main body 21 by the interface 24 on the main body which mates with an interface 27 on the module. Any suitable known interface components can be used but the components should be strong, relatively inflexible, durable and suitable for frequent disconnection and reconnection.

The modules are powered by a power supply within the main body of the portable computing device and may be partially or totally controlled by software drivers within the main body. In order to reduce the burden on the central processing unit of the main body, dedicated signal processing electronics within the modules can be arranged to perform up-front data processing as a result of which a common bus architecture to the main body is shared by all of the modules. As a result their interchangeability is enhanced.

Figure 10:
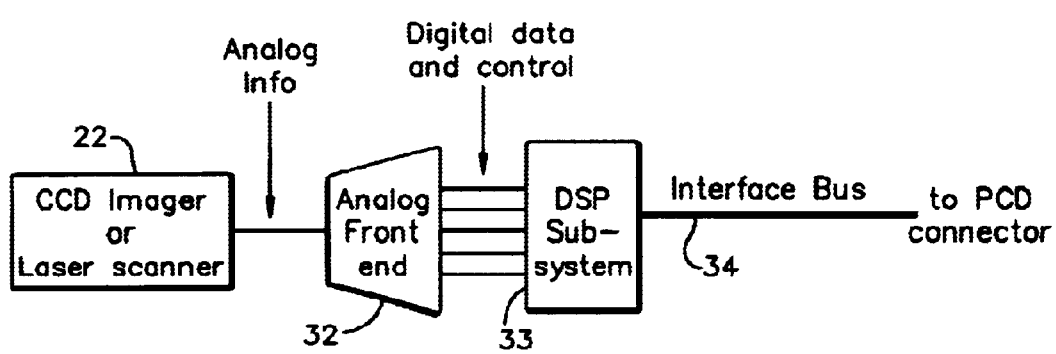
FIG. 10 is a block diagram of an image capture module for the device of FIG. 9.

A suitable architecture for an optical media capture module 28 (for example containing a CCD imager or laser scanner) is shown in FIG. 10. Each module may contain only the media capture electronics without any pre-processing capability or, as discussed above, preferably contains dedicated or programmable analog components 32 and digital signal processing (DSP) components 33 to ease the processing load placed on the central processing unit of the main body 21. The digital signal processing sub-system 32,33 in the module may be of a single electronic design common to different modules, and which is either programmed in the factory or customized on purchase or programmable by the user to perform the functions in processors if required by the particular media module. This function programmability is expected to be mainly through software, since the module processing electronics are flexible, and these software components may be one-time or dynamically loaded to the module via the main body central processing unit. Accordingly the range of components that require manufacture is decreased, appropriate dedicated parts of the components being selectable for a desired use, or a portion of the mode of operation being borne by software.

In operation, the module 28 collects information via the CCD imager or laser scanner in analog form which is transferred either serially or by conversion into a parallel format. The analog signal is then processed by the digital signal processing sub-system 32,33 and forwarded to an interface bus 34 from which the information is transferred to the main body of the portable computing device. As mentioned above, the signal processing electronics preferably perform up-front data processing such that a common bus architecture to the portable computing device 21 can be achieved.

Referring now to FIG. 11 the multi-media module 22 includes circuitry for image/video capture, audio capture and playback and a cellular telephony sub-system.

The module is arranged to receive and transmit video information independently of the main body of the portable computing device (although the video information may also be accessed by the main body of the portable computing device in order to monitor or review the information). Accordingly a radio frequency antenna 41 is provided in the module for reception and transmission of radio frequency information. A radio frequency front end processor 42 and codec 43 cooperate to perform digital to radio frequency/radio frequency to digital format conversions. Video information received via radio frequency is decompressed by an optional digital signal processing sub-system 44 for presentation, where appropriate, to the CPU of the main body 21 of the portable computing device. A further digital signal processing sub-system 45 is provided for other purposes (discussed in more detail below) and preferably performs partial video processing, the CPU of the personal computing device completing the process for displaying the results. The second digital signal processing sub-system 44 may also be required for the interface to the radio frequency codec 43 of the cellular sub-system; this depends on the amount of processing required for each function. Video information transferred to the main body 21 of the portable computing device is displayed on the LCD display 23. The radio frequency receiving, transmitting and processing apparatus 41,42,43,44 discussed above can optionally reside in a separate component such as a PCMCIA or other type plug-in card for example of the type manufactured by Symbol Technologies, Inc. Preferably, however, the circuit forms an integral part of the multi-media module to provide a full wireless multi-media solution for the hand-held computing system. As will be appreciated, the wireless link may conform to any desired cellular standard (for example CDMA, GSM, AMPS) that is preferably selected to allow the widest application of the invention.

The multi-media module 22 further includes a microphone/speaker component 50 which receives and transfers input analog information to an analog to digital converter 51,45 comprising an up-front voice-band converter 51 which transfers information either serially or in parallel to the digital signal processing sub-system 45. Similarly, information may be transmitted in the other direction, for example digital information from the main body of the portable computer device is converted to an analog audio signal at converter 45,51 and converted to sound by the speaker component 50. Base-band digital audio data is processed by the digital signal processing sub-system 45 which can be reprogrammed as appropriate to perform appropriate audio codec processing. Voice-band (VB) signals are converted by the converter 45,51 as discussed above.

Video data is captured by a CCD imager 52 compressed by a digital signal processing sub-system 53 and forwarded to the radio frequency codec 43. Once again the main body of the portable computing device need not be involved in this data transfer unless the user decides to monitor the transfer. In that case, a software controlled process may be initiated whereby the video data is sent to the CPU of the main body 21 of the portable computing device for display before compression as well as to the radio frequency codec 43 for transmission allowing the captured image to be viewed while or before transmitting.

The multi-media module 22 is preferably mounted so as to be rotatable through at least 180° when connected with the main body of the portable computing device. This may be achieved by hinging or pivoting or otherwise arranging a portion of the main body or by similarly arranging a portion of the module. This positioning allows capture of the user's image while the user can simultaneously view the LCD screen display for received video data or images. The rotation of the image capture portion of the module permits capture of images of objects in front of the user while the user is looking at the screen.

The microphone and speaker combination may be arranged to face the user in a preferred, standard configuration of the device as a whole. The microphone may further be configured to swing or swivel away from the main body of the portable computer device and from the user holding the device if the desired audio data to be captured emanates from another direction.

Figure 12:
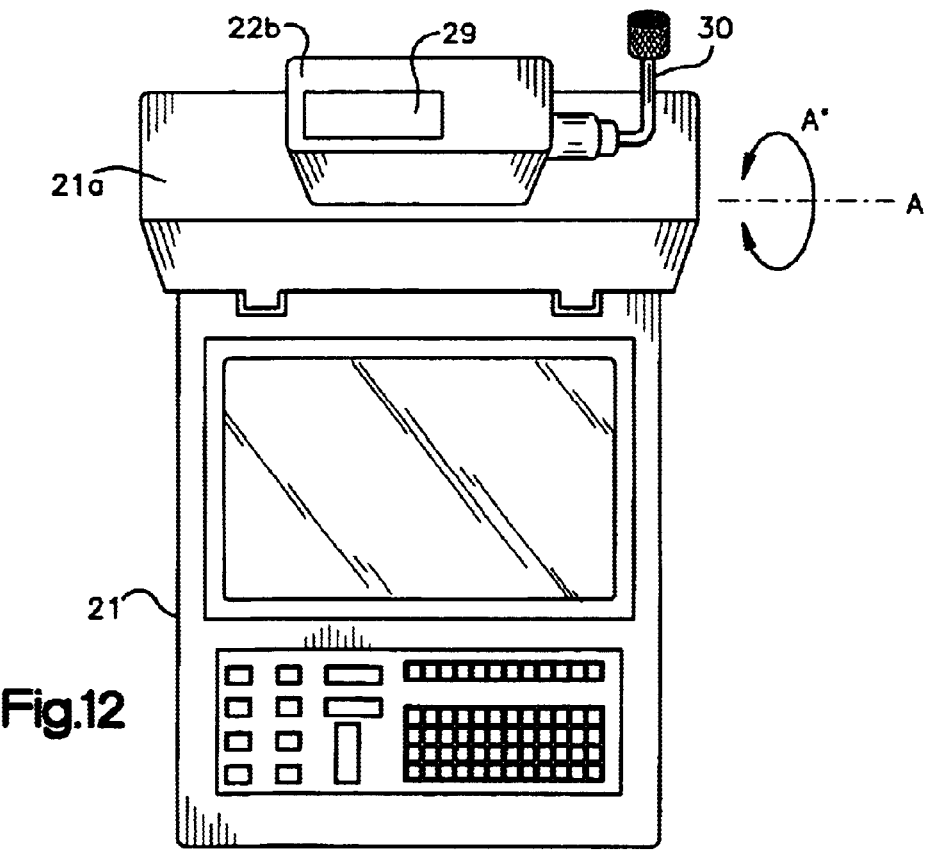
FIG. 12 is a perspective view of a variation of the device of FIG. 9.

An appropriate arrangement including a pivotable module head 22 and a swingable microphone boom 30 is shown in FIG. 12. In the embodiment shown an upper portion 21a of the main body 21 is hinged to the remainder of the main body and rotatable around an axis A as shown by arrow A'. The multi-media module 22 is connected to the upper portion and the upper portion has been swivelled such that a CCD image capture device 29 faces the user. The pivotable microphone boom 30 also extends from the multi-media module 22. It will be appreciated that a number of pivoting orientating arrangements can be provided, for example a hinge or pivot could be provided within the structure of the module 22, and the module could also be arranged to rotate through 180° about an axis transverse to axis A. Similarly, the microphone boom 30 can be pivotally mounted to the module 22 in any known manner.

Accordingly it will be seen that the invention can be used to provide modular programmable multi-media facilities in the hand-held form factor by portable computing devices such as hand-held terminals or "portable digital assistants". The invention can be used for CCD based bar code decoding (in one or two dimensions at least) by industrial and commercial users, for example for point of sale processing or inventorying; portable, cellular video conferences by travelling business users; and digital photography/image capture for insurance assessors, sales professionals among many other applications that will be apparent to those skilled in the art. It will be appreciated that the portable modules discussed above may be used in cordless scanning implementations for example in point of sale applications. Problems arise where such portable devices are not tethered in some manner as it is possible that they will be lost, removed from the store, or otherwise misappropriated.

To overcome this, it is possible to put surveillance tags of a known type into the scanner such that if the scanner is accidently taken by a customer an alarm will sound at the front of the store as it would if any other product carrying such a surveillance tag was carried out of the store.

Alternatively the scanner can have some form of internal alarm which sounds if the scanner is taken more than a predetermined distance from the base. Where the scanner communicates with the base by wireless communications such as radio communication, the software protocol managing the radio session could control the range finder and alarm.

In order to locate portable scanners that have been misplaced an alarm or "beeper" can be placed in the scanner and triggered by a signal from the base controlled by, for example, a button on the base pressed by the user. Accordingly when the user pressed a button the scanner could be located by following the noise of the sound.

Figure 13:
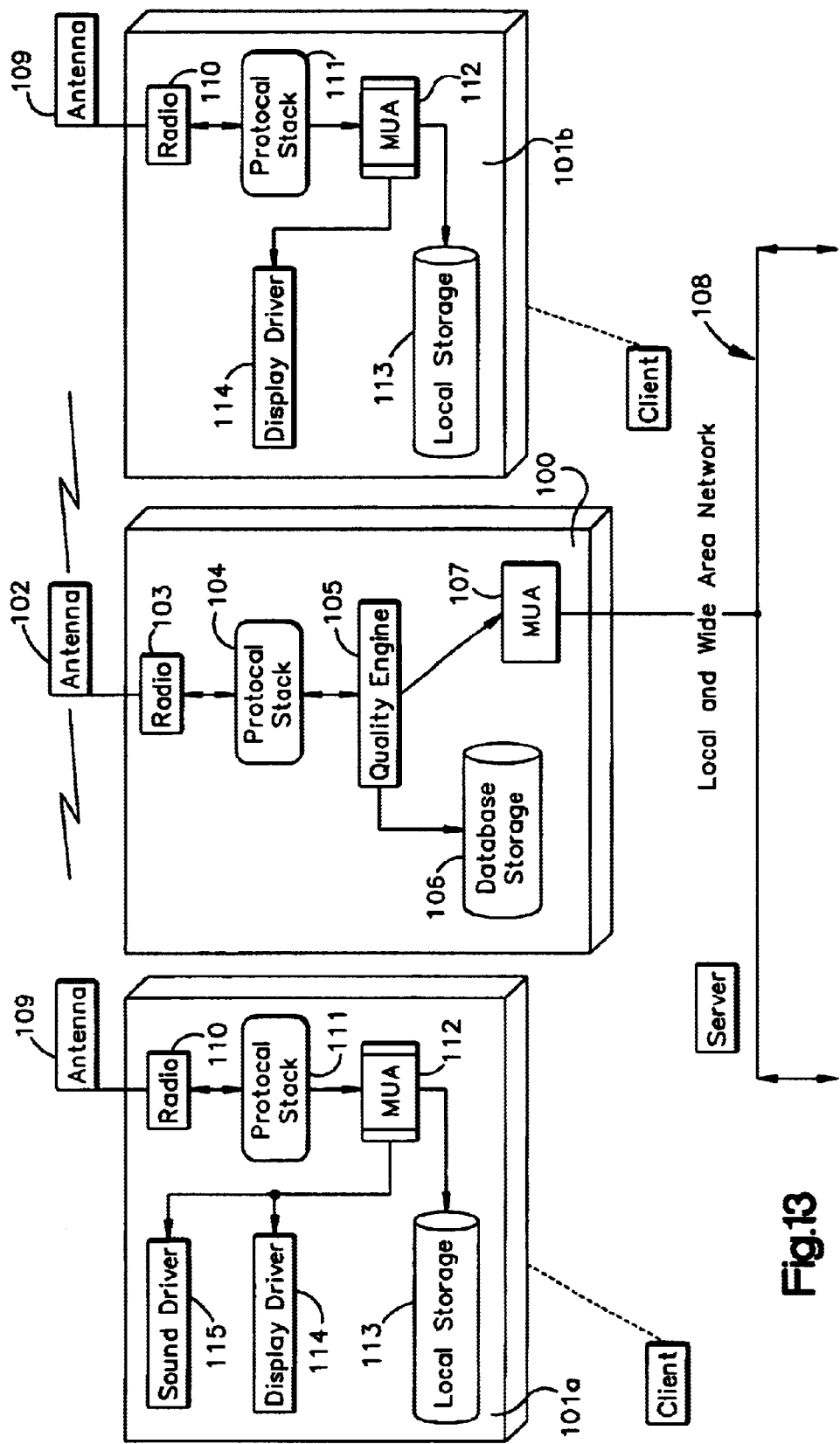
FIG. 13 is a block diagram showing the components of a distributed mail delivery service according to another aspect of the invention.
Figure 14:
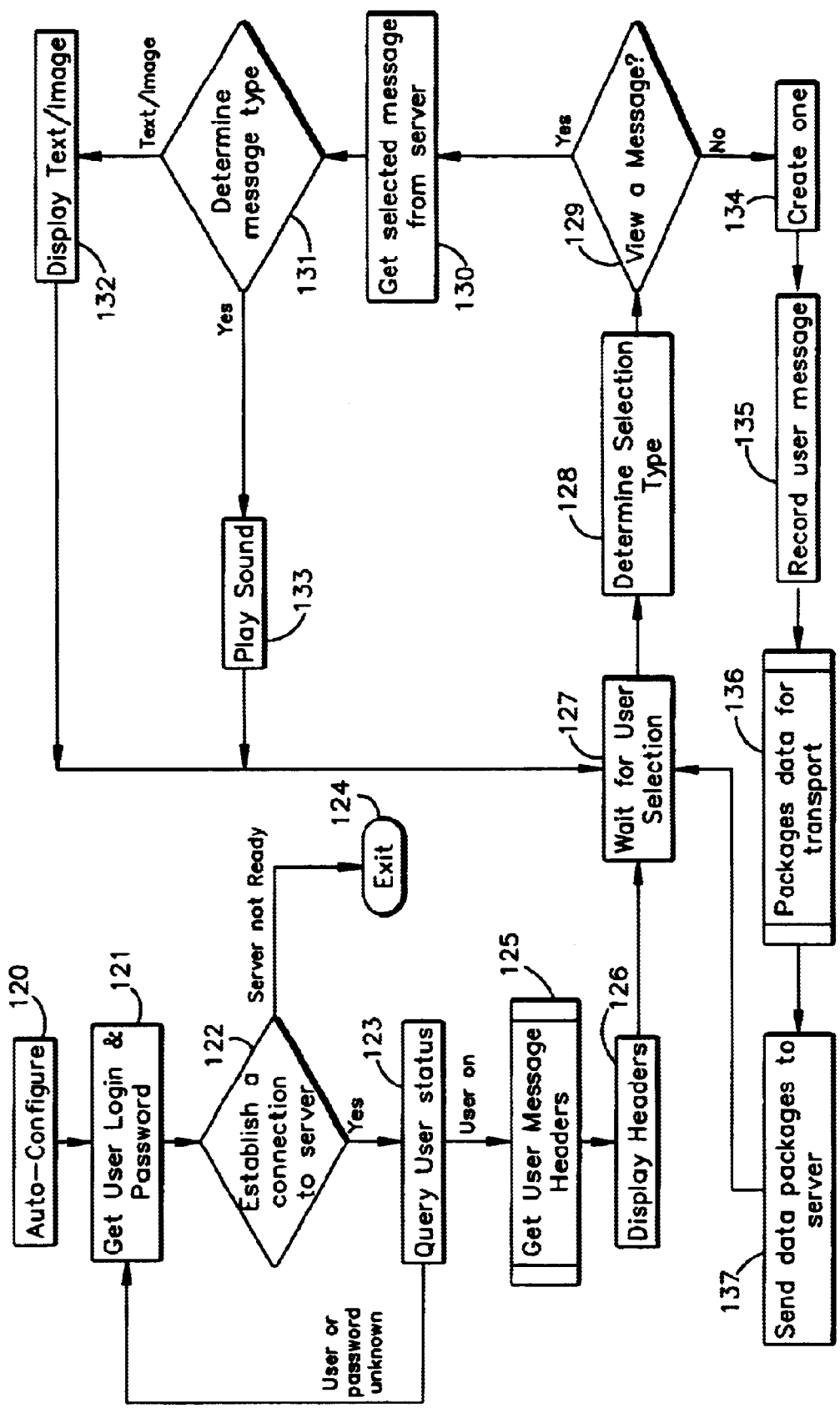
FIG. 14 is a flow chart showing operation of a client portion of the service of FIG. 13.
Figure 15:
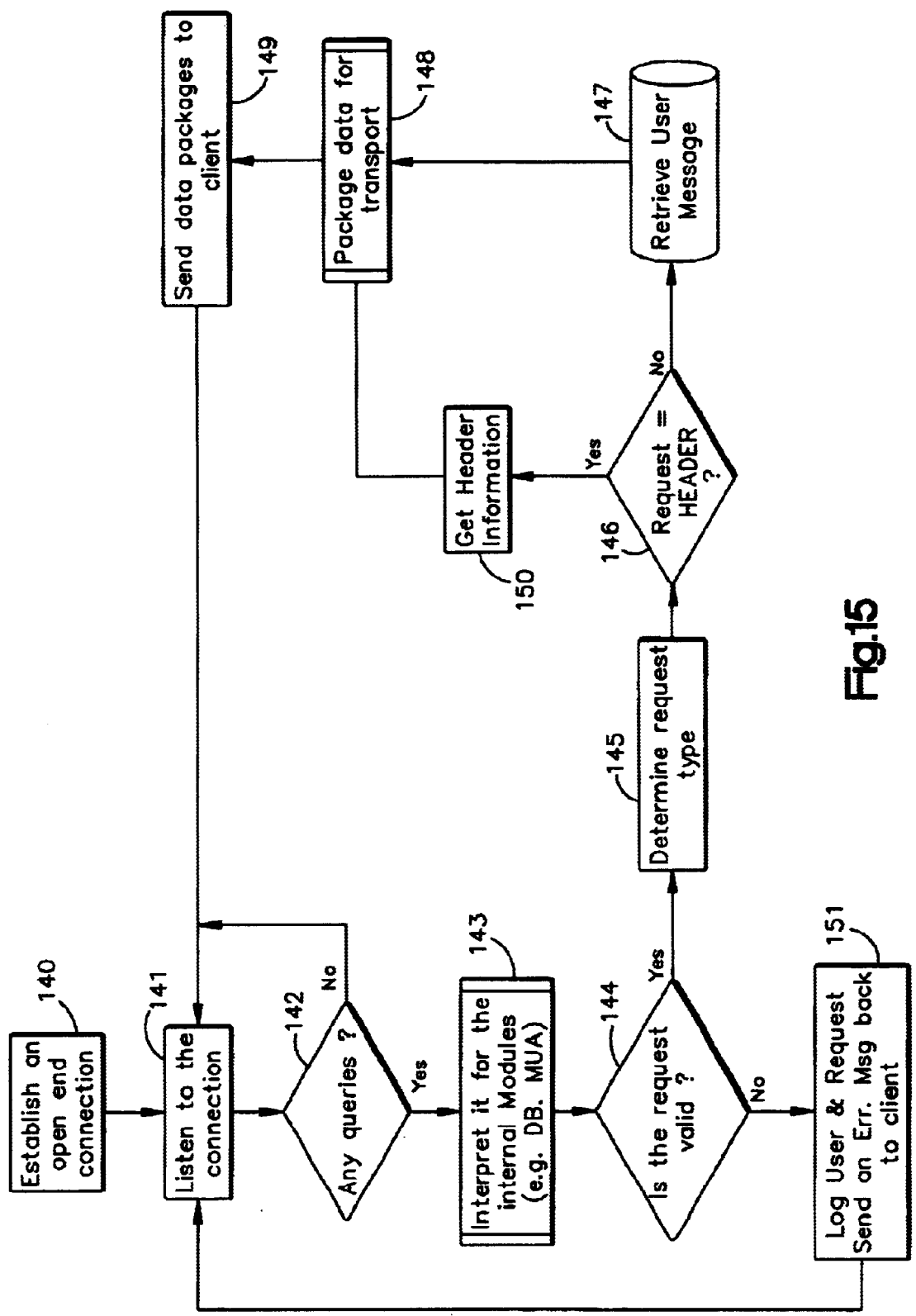
FIG. 15 is a flow chart showing operation of a server portion of the service of FIG. 13.

A further use for portable computer devices is the electronic mail box or mail delivery service application. Referring to FIGS. 13 to 15 the invention provides an improved architecture for electronic mail box systems including portable computer devices. The improved system uses a distributed message delivery service architecture, based on cooperating processes. Within a network a particular machine is designated as a server and its address becomes public on the local network. The server is responsible for delivery of mail and reception of mail and also provides other machines on the local network with information regarding user message status, for example whether a message has been received for an identified user, in which case the message can be forwarded to the user. The remaining machines on the network are designated the client and carry out a corresponding process, in particular providing a user interface to the distributed mail delivery service. For example the client portion can present various options to the user for example the options of hearing audio messages or viewing text or still images. The options presented will, of course, be based on the resources available to a particular machine, for example whether it has a sound card and/or graphics capabilities.

Referring specifically to FIG. 13 there is provided a server 100 and a plurality (shown as 2 in the figure) of clients 101a,101b. The server 100 includes an antenna 102 for communicating with remote clients 101a,101b (for example portable computer devices), a transmission and reception module 103, a message coder and decoder 104 (protocol stack) and a processing module 105 (query engine) for handling queries from clients 101, for example regarding a particular user message status, accessing any such messages etc. Information is accessed from a memory 106 which may be a data base storage module. The processor 105 also communicates with a mail user agent (MUA) module 107 allowing user interface with the server 100. The server 100 is further in communication via the mail user agent 107 with a local and/or wide area network designated generally as 108.

The service may form part of, or be configured for connection with a telecommunications network or a computer network, for example the "Internet".

Each client 101a,101b includes various modules common with the server together with further modules specific to the needs of the client. The client 101 includes an antenna 109 for communication with the server and a transmitting/receiving module 110 communicating with a message coder and decoder 111. The module 110 will include the hardware necessary for carrying out the transmitting/receiving steps but it will be recognized that at least some of the functions provided by the module will be capable of being provided in software. Indeed, generally, reference to modules need not be to dedicated hardware but extends to programmed or programmable software arranged to emulate hardware performance. The message coder and decoder 111 interacts with the mail user agent 112 providing user interface. In addition the mail user agent 112 communicates with a local data storage device 113 and with optional modules such as a display driver 114 and/or a sound driver 115 (see client 101a).

Operation of the distributed mail delivery system may best be understood with reference to FIGS. 14 and 15. FIG. 14 displays the steps carried out by the user in a typical "client process". On commencement of operation the client auto-configures itself based on the resources (for example sound or graphics) available on the machine [step 120]. The user logs in and enters a password [121] and a connection is established between the client and the server [122] at which stage information entered during the log-in and password process is sent to the server for verification [123]. If, however, the server is not ready for communication then the procedure is exited [124] and must be recommenced at step 120 or step 121. After the user status is queried [123], if the user or password is unknown to the server the process returns to step [121] and the log-in and password procedure is re-initiated. Otherwise the options available to the user are retrieved [125] in steps discussed in more detail with reference to FIG. 15 and displayed as headers to the user [126]. The user then enters his selection [127] and the selection type is determined [128].

The client assesses whether the user wishes to view a message [129] and if so retrieves the selected message from the server [130] in a series of steps described in more detail below with reference to FIG. 15. The client then determines the message type, for example audio or visual [131] and dependent on the message type either displays the text [132] or plays the sound [133]. The client then returns to step [127] and awaits a further user selection.

If at step [129] the user indicates that it is not desired to view a message then a message is created [134], recorded [135], the data of the message is packaged appropriately for transport [136], for example by the protocol stack 111 shown in FIG. 13, and is sent to the server [137] by the transmitter 110 and antenna 109. The client then returns to step [127] and awaits a further user selection.

The client machine includes suitable input means, for example a keypad and display means for example an LCD display for the entry of user selection choices, message information and for the display of messages. In addition a speaker and microphone may be provided for the recordal and playback of audio messages. A portable computer device such as that shown in FIG. 9 may, for example, be used as the client 101. In that case, auto-configuration of the client is carried out partially in dependence on the type of module 22 inserted into the main body 21 of the portable computer device 20.

Referring now to FIG. 15 the steps of a typical "server process" are shown. The server operates as a continuous process but, in order to save system resources is mostly in a stand-by mode where it simply listens to the local network. Accordingly in step [140], on initiation, an open end connection is established and the server monitors the connection [141]. If any queries are received [142] the server proceeds to the subsequent steps but otherwise continues to monitor the connection [141]. On reception of a query the server "wakes-up", interprets the query to establish which of the internal modules of the server is designated [143] (for example data base storage 106 or mail user agent 107) and if the request is valid [144] the request type is determined [145]. The request may be a HEADER which is sent to the client to present user message headers (corresponding to steps [125] and [126] shown in FIG. 14); accordingly at the request for a header [146] appropriate information is retrieved [147], is packaged for transport [148] for example at modules 104,103 of the server and is sent to the client [149]. The server then returns to monitoring mode [141] listening to the connection with the remainder of the network.

If at step [146] the request is not for HEADER information then the server retrieves any user messages [147] that are stored in respect of the identified user (for example on the basis of the log-in or password information entered at the client) and the data is packaged and sent as described above in relation to steps [148,149]. The system then returns to monitoring mode [141].

It will be seen that steps [142–147] are carried out by the query engine 105 of the server, user message data being retrieved from the memory device 106 of the server.

Where, at step [144] the request is not valid then the user and request are logged and an error message is sent back to the client [151]. The system then returns to monitoring mode [141].

The system described above requires far less data storage on the client terminal/computer and thus is particularly (although not exclusively) suitable for hand-held computers with basic network capabilities. The system thus resolves the problem of mail box locations as well as releasing the hand-held host and the data storage and retrieval responsibility by treating the mail delivery service as two cooperative and independent processors that communicate with each other using basic network protocols.

In effect, unlike conventional mail delivery service systems, the distributed mail delivery service uses the underlying network to actively present enquiries to the server regarding the message status relating to a particular user, rather than using a directory structure and relying on a file system. Because all enquiries are directed to one server, multiple connections for a single user can be identified and refused, the server is the only point of connection to external entities, offering a more secure delivery system and the server offers a view of the mail delivery service to the end user which is independent of the actual matter stored by the server.

In addition clients are relieved of the responsibility of storing or directly retrieving any of the actual data. Messages are delivered via the network on a demand basis, that is when required by the user, and the client portion of the distributed mail delivery service simply translates user requests into a series of commands which are forwarded to the server in the form of queries. If the quieries are validated the server returns the necessary data to a client in response to the queries. By virtue of the separation of tasks the system designer gains the freedom to modify components of the system independently. For example it may be initially decided that the server should store messages using a simple mail box scheme, but if the capacity or speed or efficiency of the system subsequently needs to be enhanced as a result of the increased burden placed on it by an increasing number of users and messages, the server can revert to using a complete database management system. Any such modifications will, however, remain hidden from the client portion and the client portion can effectively remain unaware of the underlying structures of the server indefinitely.

Similarly, the client portion may be modified for example to move from a character-based user interface to a graphical-type interface in which case the server may remain unaware of the modifications as the basic data query and exchange mechanism is unchanged, the server remaining unconcerned about the manner of data presentation at the client portion.

Accordingly a voice mail delivery system is implemented. The client portion may run on a PC compatible platform although it could be ported very simply to other platforms. The server can operate on UNIX or DOS platforms. The client requires less than 256 bytes of local storage.

It will be seen, therefore, that the proposed delivery system offers multiple advantages over current mail box schemes, providing flexible and independent modules which are simpler to maintain and modify and which offers a generic mechanism by which data transfers can be implemented over data networks. As it is a distributed system it does not require the presence of a network file system and simply relies on local storage.

In particular, because a server is provided on each local network for dealing with the clients within a local network and also for communicating with other serves on other local networks the roaming capabilities of the system are enhanced. The distribution of mail processing between the various local networks is in contrast to the centralized hub system in conventional mail delivery systems and allows simplified and accelerated mail processing and transfer in combination with a roaming portable computer.

Further aspects of the present invention will be discussed in conjunction with Symbol Technologies Inc. spread spectrum wireless networks: Spectrum One (operating at a frequency range of 902 to 928 MHz) and Spectrum24 (operating at a frequency range of 2.4 to 2.5 GHz). However, the embodiments discussed are applicable to other wireless communications systems.

Part 1: "Symbol" Terminal Emulator Program (STEP) and pen-based mobile units/terminals.

Symbol (a Trade Mark) terminal emulator program (STEP) is a tool used to format applications for pen-based mobile units such as the mobile unit 21 shown in FIG. 9.

Figure 16:
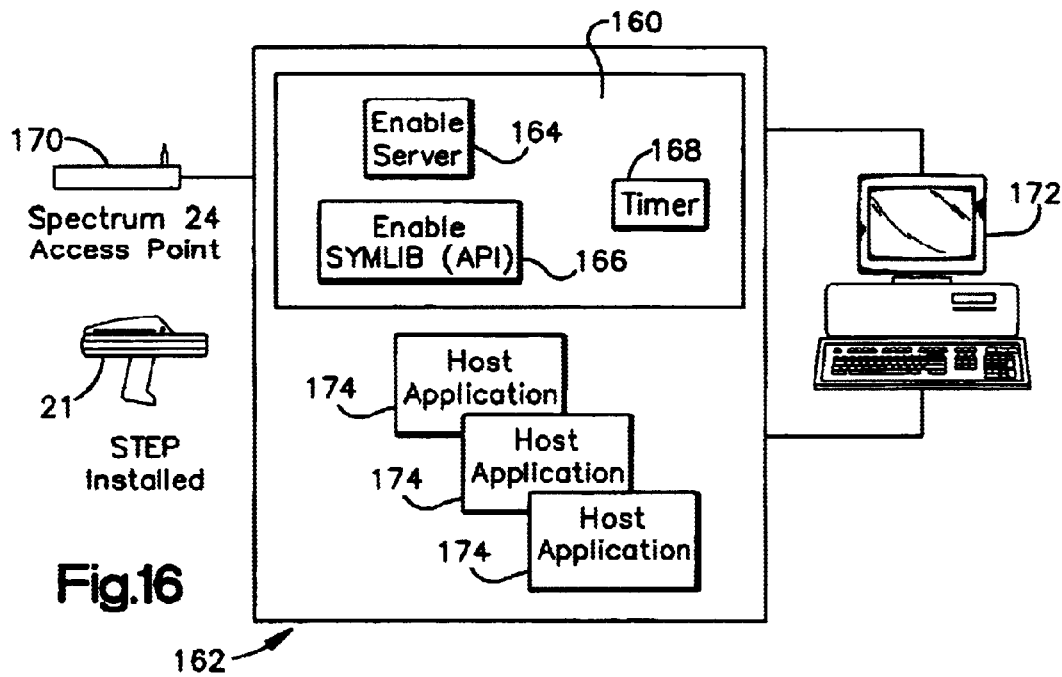
FIG. 16 illustrates a block diagram of a conventional wireless communication system with a terminal emulation program installed on the mobile units.

An example of the Spectrum24 system is shown in FIG. 16. The STEP resides in the mobile units 21 and works with an enabler development system 160 on a host computer 162 to execute a predefined set of commands set from the host computer 162. The enable development system 160 includes an enabler server 164, an enabler application program interface 166 and a timer 168. The enabler development system 160 receives input from the Spectrum24 access point unit 170. The host computer 162 is controlled by a terminal 172 to run host applications 174.

The STEP provides the mobile units 21 with the interface and logic functions necessary to communicate over the radio network, and controls all input, output and display functions at the mobile unit level, including keyboards, displays, scanners and peripherals, and printer support.

The STEP provides commands that allow the administrator to create a selection of data entry fields for the mobile unit operator. For example, these commands would permit the operator to: (a) enter data from a keyboard and scan bar codes; (b) send multiple messages to the host in the same transaction; and (c) control the type of data entered and validate entered data. Further, for display purposes STEP allows the administration to (a) display data at any location on the mobile unit screen; (b) clear the entire mobile unit screen or clear a single line; (c) save and restore the mobile unit screen; and (d) control the backlighting feature to view the screen in the dark.

The STEP acts as a power manager to reduce demands on the batteries in the mobile units 21, enabling them to operate longer between charges and extending their overall life.

By installing STEP on the mobile units 21, forms can be created and displayed on the display screen 23 (shown in FIG. 9). Forms can include messages, prompts and data entry fields. This permits an operator to recall a stored form for execution on the mobile unit 21; repeat the execution of stored from for on-line batch processing; and erase all stored forms and determine the date and time of the last form definition.

The STEP enabled mobile units 21 allow the host computer 162 to read data files stored in the unit 21; sound the mobile unit's 21 alarm; interrupt mobile unit 21 input activity; and log off the mobile unit 21 from the host computer 162. This allows the operator to use the mobile unit 21 to collect data without being logged on to the host computer 162; set and save system parameters; download files from the host computer 162 to the memory in the mobile unit 21; and perform other maintenance tasks.

Figure 17:
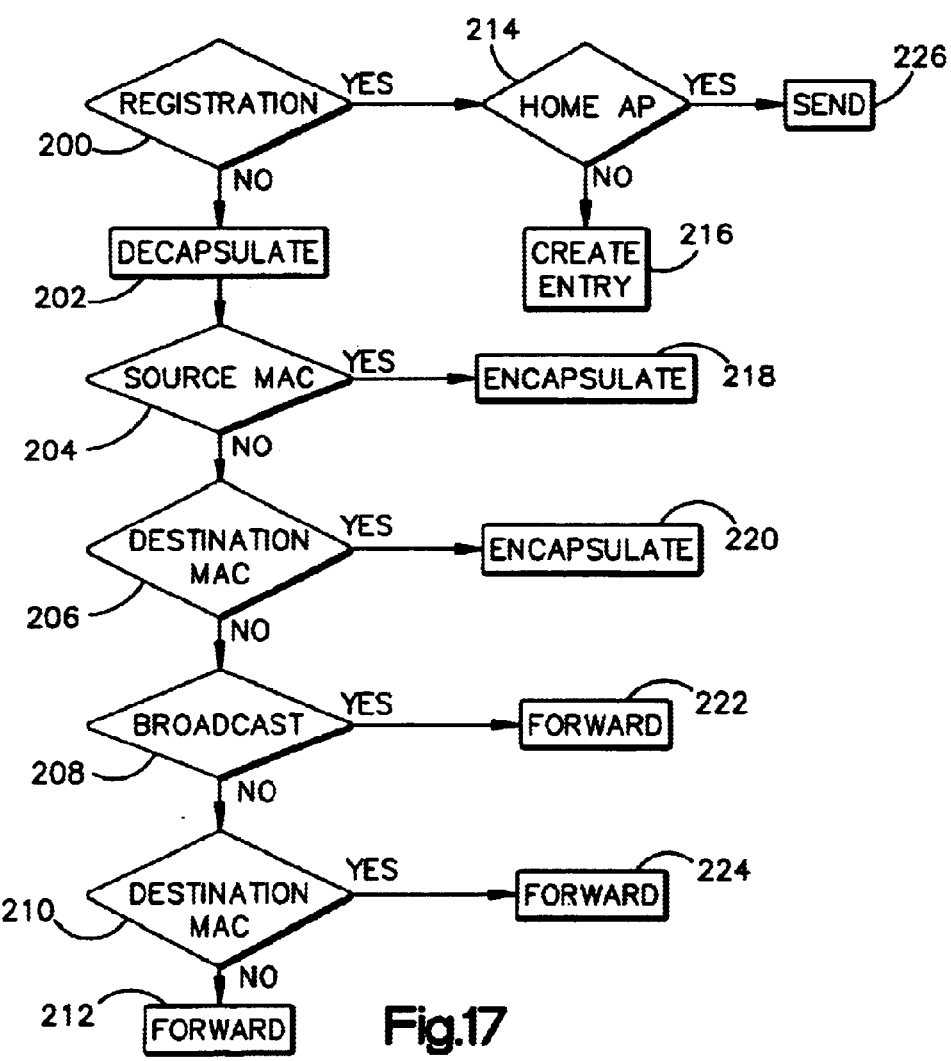
FIG. 17 illustrates a flow chart illustrating an access point's action upon receiving a packet from a mobile unit according to the prior art.

FIG. 17 illustrates a typical conventional flow chart of the actions taken by the access point 170 when it receives a packet of data from he mobile unit 21 on the wireless network. If the packet is a registration packet, determined at step 200, then the access point 170 processes the information carried by the packet at step 214. The type of association is determined by examining the IP address of the mobile unit's 21 home access point and does the control message exchanges accordingly at steps 216 and 226. If the packet is not a registration packet, as determined by step 200, then the packet is decapsulated at step 202.

If the short term address mapping tables (ST-AMT) of the access point 170 has an entry of the packet's source MAC address, determined at step 204, then the packet has originated from the mobile unit 21 that is away from its home stationary data link (SDL) network and processing passes to step 218. At step 218 the access point 170 encapsulated the packet within a UDP packet with the IP destination address set to that of the mobile unit's 21 home access point.

If the long term address mapping tables (LT-AMT) of the access point 170 has an entry for the packet's destination MAC address, determined at step 206 then the packet is meant for a mobile unit that is currently outside its home access point group (APG) and processing proceeds to step 220. At step 220 the access point 170 encapsulates the packet within an UDP packet with the IP destination address set to the destination mobile unit's local access point.

If the packet's destination MAC address is a broadcast address, determined at step 208, then the packet if forwarded at step 222 on its wired and wireless interfaces. If the destination MAC address in the packet appears in the access point's mobile host table (MHT), determined at step 210, then the packet is encapsulated within a wireless link layer packet and forwarded on the wireless interface at step 224. Otherwise, the packet is forwarded on its wired interface at step 212.

Part 2: Assigning domains and IP addresses to said pen-based mobile units 21.

The following embodiments of the present invention deal with assigning domains and IP addresses to the mobile units 21 to operate in a wireless LAN technology, such as the previously discussed Spectrum One and Spectrum24 systems.

According to an embodiment of the present invention the domains and IP addresses are hard coded. The hard coded embodiment involves setting the domain and IP address of the mobile unit 21 in the configuration files associated with the Spectrum24 drivers and protocol stacks.

The hard coded embodiment provides a relatively simple implementation of domain and IP address assignment for Spectrum24 network installations when only a few mobile units 21 are used that always use the same APG on the same network. In addition, a high degree of security is provided since the ability to detect and assign domain and IP addresses are available only in the configuration area, not in the operational area.

The hard coded configuration of each mobile unit 21 ensures that the domain and IP address information are non-volatile. This insures that even cold booting the mobile unit 21 will not require configuration. All the access points 170 in the target APG can be configured to use the hard coded domain. The server can be set up to reserve permanently (without any timeout) the hard coded IP addresses for use by each hard coded mobile unit 21.

Another embodiment of the present invention involves the application-selection of domains and IP addresses. This embodiment is suitable for situations where a system administrator manually configures the mobile units 21 before their use by operators by setting the domain and IP address. In particular, when mobile units 21 are the only nodes on the network or when the system administrator set domains and IP addresses by referring to a master list maintained on a network server the application-selection system is advantageous.

For situations where the operator must identify the selections as he moves between APGs or networks a more sophisticated application is provided to allow the system administrator to establish logical names for domains and IP addresses so that operators can pick the appropriate settings by choosing a meaningful name such as truck, warehouse, depot, etc.

The application-selection method allows for the dynamic adjustment of domain and IP addresses under application control across APGs and networks.

A further embodiment of the present invention involves the access points-assignment of domains and server-assignment of IP addresses. This method is suitable when the manual assignment of domains and IP addresses is impractical due to many mobile units 21 or due to the complexity of the network.

AP-assignment of domains requires configuring access points 170 to allow for an automatic configuration. Using the access point 170 access control list (ACL) features, security can be enhanced by giving the access points 170 a list of the MAC-layer addresses of all the mobile units 21 allowed. This list can be larger than the number of mobile units 21 actually being serviced at any given time, allowing the timesharing of the capacity of the access point 170 among a large set of intermittent use mobile units 21.

Server-assignment of IP addresses requires the existence of a mechanism within the protocol stack, supported by services and utilities in both the server and the mobile unit 21, to allow dynamic allocation of IP addresses. BOOTP and DHCP are two common mechanisms for dynamic allocation.

BOOTP works by having a file on the server for each possible mobile unit 21, selected by the mobile unit's 21 unique MAC-layer address, that provides the IP address to be used for the mobile unit 21.

DHCP works by having a database on the server that records the IP addresses that are in use (by MAC-layer address) and the IP addresses that are available for dynamic assignment. When a mobile unit 21 requests an IP address, the database is searched for the MAC-layer address. If an IP address is already allocated to this mobile unit 21, the it is simply returned. If no IP address is allocated to the mobile unit 21, and one is available for dynamic assignment, it is allocated to the mobile unit 21, recorded in the database and assigned to the mobile unit's MAC-layer address, and returned to the mobile unit 21. The DHCP server can set to timeout when a dynamically assigned IP address has not been used for some time and return it to the available list or to keep IP addresses permanently assigned once allocated to a mobile unit 21.

The domains and IP addresses can be stored in volatile storage, but would need to be reentered following a reboot. However, the necessary address information can be stored onboard the flash of the mobile unit 21, or on the Spectrum24 adapter card, or on RAM disks or PCMCIA storage cards.

The AP/server-assignment methods provide the ability to program ACL information via a personal computer attached to the same hardwired router as the access point 170. Further, the AP/server-assignment methods allow for automatic assignment of complying domain and IP addresses as needed, and allow mobility across APGs and networks.

According to another aspect the invention addresses the problem of the necessity of a specialized program for parsing and interpreting high density data records embedded in bar code labels. In accordance with the invention it is proposed to distribute not only the bar code data on a high density label, but also information describing how to create an interface capable of reading the data from the data record label.

Implementation of the invention will be familiar to the skilled man in the operation of the Internet Web Browser suitable for reading, for example, Hyper-Text-Markup-Language (HTML) files. Those files are used to describe an interface to be built by Web Browser. In the present invention the mobile unit includes a reader or Browser for scanning a high density bar code label that contains a program script such as HTML, VB script or a specialized compressed version of either. The script is parsed and interpreted by Browser which constructs a user interface at run time and presents it to the user. The user interacts with the interface by scanning data labels and interacting with any of the program's controls presented to the user to properly process the data. According to one aspect a new data or interface level may be printed by the user that can be applied to the object being processed. It will be appreciated that, as bar code label densities increase, the capability of storing the actual interface and the data record in a single bar code label will appear.

Figure 18:
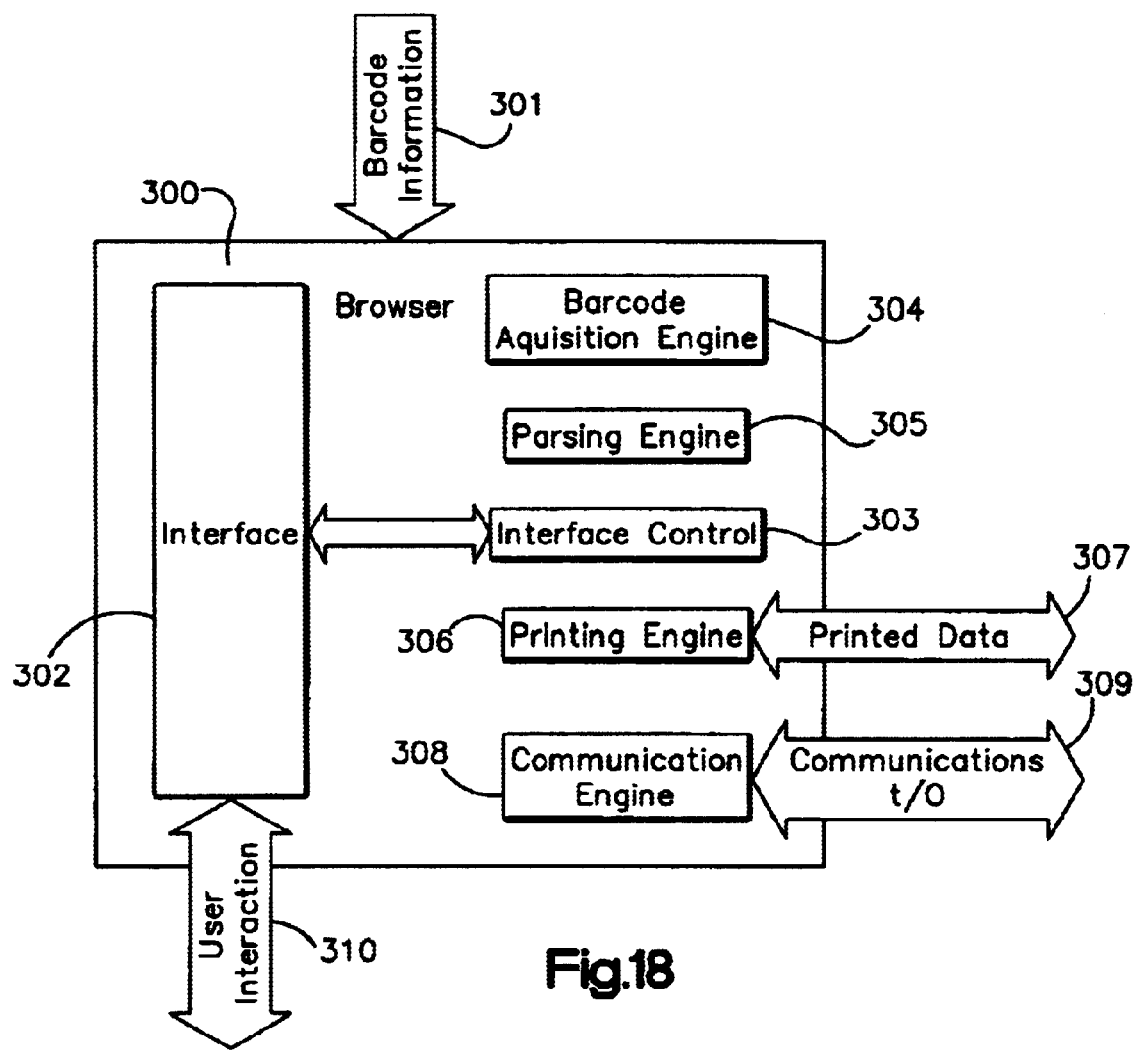
FIG. 18 is a block diagram of a general purpose interface reader application according to another aspect of the invention.

FIG. 18 shows the system of the invention in more detail. The system includes a Browser 300 to which bar code information 301 is input. An interface 302 is constructed at run time and an interface control 303 is provided. The Browser 300 further includes a bar code acquisition engine 304, a parsing engine 305, a printing engine 306 with a printed data interface 307 and a communications engine 308 with a communications input/output interface 309. The user interacts with the interface via a further interface 310.

It will be appreciated that the manner in which the information is encoded in the bar code label will be familiar to the skilled man, and that the software and hardware required will also be familiar to the skilled man.

This system is particularly advantageous with respect to transportation and identification of goods. The shipper of the goods can distribute a program script label with the goods that is read by the receiver's Browser. The program script label shipped with the goods contains the information required to allow the Browser to create an interface at run-time to read and process the data for the container of goods shipped.

Logistical systems benefit greatly from a system such as this, because unidentified materials in the field can quickly be identified and processed by any unit containing the Browser.

The administration of the hardware and software contained in these systems is greatly reduced, because the Browser contained in the Mobile Unit (MU) stays static. Only when new Browser features need to be distributed do the MUs need to be updated. All interfaces are distributed on high density barcode labels. This system of application program distribution truly makes the computer system general purpose. An infinite number of different interfaces can be read in and executed by the Browser. No longer are users limited by secondary storage on their MUs for storing application programs.

Using this new system, any computer system equipped with a general purpose interface reader application (Browser) can create an interface "on-the-fly" that is capable of reading processing information on the accompanying data record labels.

Systems deployed in the field no longer need their application programs updated when changes to the program file is required. Only the program script label need be replaced. The number of different data formats that can be processed by a particular computer system is limited only to the number of program script labels available to the user.

Different users of such a system can freely exchange information because the interface information needed to process the data files is distributed on a label along with the data files themselves. Each user no longer needs a copy of the specialized application program that was previously required to read the data label.

According to another aspect of the invention there is provided a bar code scanning OLE (Object Linking and Embedding) COM (Component Object Model) object for communicating commands and bar code data over a wireless link. As discussed in more detail below the object uses OLE automation to be a "plug-in" development OLE control extension. It thus becomes an in-process OLE automation object. The in-process OLE automation object controls a bar code scanning device over a wireless link on a remote client. The remote device enables a bar code reader and collects the bar code information, returning the data over the wireless link to the OLE automation object.

The general principles of OLE architecture will be well known to the skilled man. In the present embodiment, a scanning object is implemented as an OLE control. OLE controls are re-usable software components designed to work in containers that support OLE 2.0. OLE controls are more powerful and more flexible than previous systems such as VBX Custom Controls in particular as, unlike the VBX Custom Controls that they are replacing OLE controls support 32 bit environments and are not limited to Microsoft Visual Basic (Trade Marks).

OLE controls are designed to work in any container that supports OLE 2.0 including not only Visual Basic 4.0 and beyond but also OLE-enabled container applications such as Microsoft Office (Trade Mark). Additionally OLE controls work in third-party OLE-enabled applications in development tools.

OLE architecture enables different software objects to communicate to each other using a binary interface mechanism. This allows software objects to be developed separate from each other and bind very late at run time. The software interface is a contract between the container and the control on how the two software objects will interact and exchange information.

Figure 19:
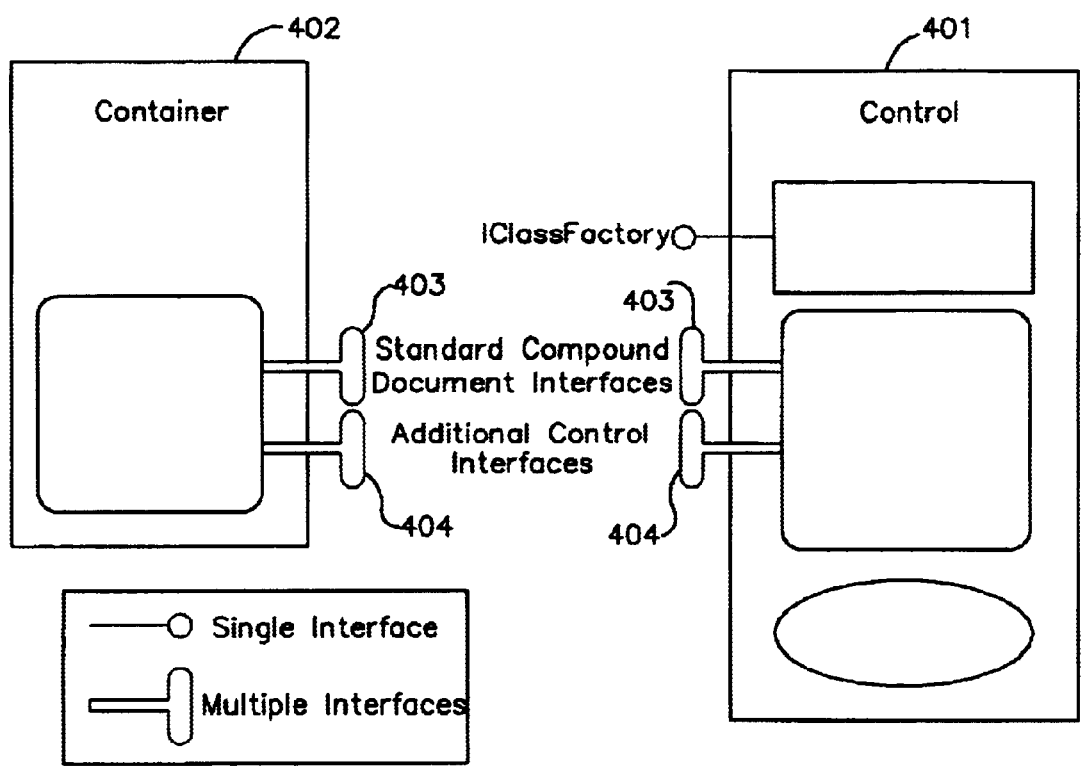
FIG. 19 shows the interface between a scanning control and a control container according to a further aspect of the invention.

Under the OLE architecture, the scanning object can be placed and activated in any of a variety of containers that support the OLE container interface. FIG. 19 shows the general mechanism between a control 401 and its container 402. As can be seen the mechanism includes standard compound document interfaces 403 and additional control interfaces 404, each comprising multiple interfaces.

In such a system the scanning control appears to become a seamless part of the container's environment. Through the exposed interfaces the two objects communicate and integrate with each other.

Figure 20:
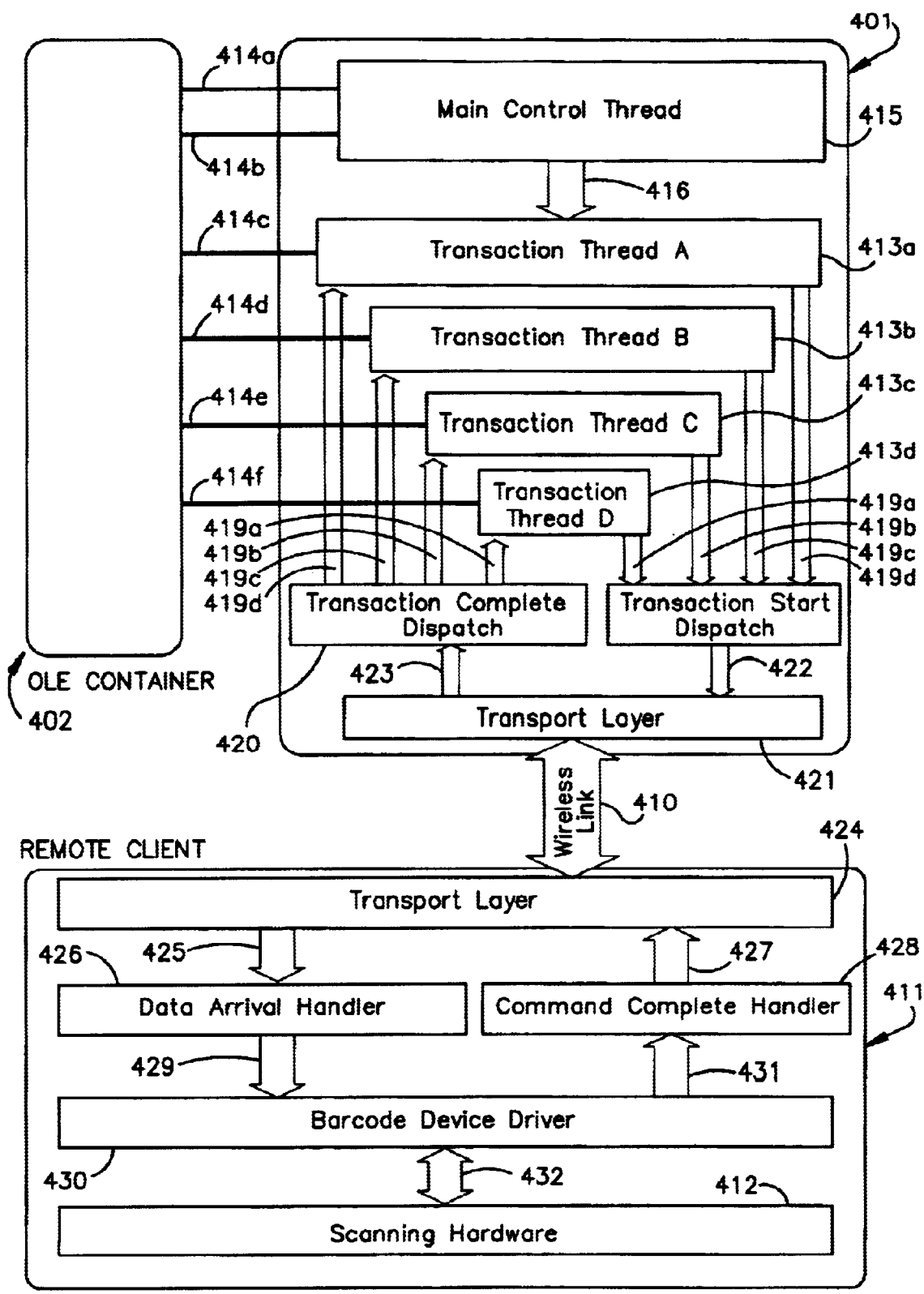
FIG. 20 shows multiple threads of execution maintained by the control of FIG. 18.

In addition, as shown in FIG. 20, the scanning control 401 communicates over a wireless link 410 with a remote computing client 411 to control the bar code reading device 412. The scanning control 401 sends commands over the wireless link 410 by creating separate threads of execution 413a to 413d that send, receive and synchronize bar code reader transactions over the wireless link. As shown in FIG. 20, the OLE container 402 and control 401 communicate via lines 414a to 414f. The OLE control includes a main control thread 415 which communicates with the OLE container 401 via lines 414a, 414b and with a first transaction thread A 413a via a line 416. Each of the transaction threads 413a to 413d communicate along a respective line 414c to 414f with the OLE container 402. Each of the threads also outputs through a respective first line 417a to 417d to a transaction start dispatch function 418 and receives an input via a respective second line 419a to 419d from a transaction complete dispatch function 420. The transaction start dispatch function 418 communicates with a transport layer 421 in the remote client 411 via a line 422 and a transaction complete dispatch function 420 receives input from the transport layer 421 via a line 423. The remote client 411 includes a corresponding transport layer 424 which outputs via a line 425 to a data arrival handler 426 and receives an input via line 427 from a command complete handler 428. The data arrival handler 426 outputs via line 429 to a bar code device driver 430 and the command complete handler receives an input 431 from the bar code device driver 430. The bar code device driver 430 communicates with the scanning hardware such as a bar code reader 412 via a line 432.

As a result users can develop applications using OLE-enabled development tools like Visual Basic 4.0. The user simply inserts a new scanning object into their project, sets required properties, writes necessary code for event notification and the scanning control seamlessly talks to the remote client bar code scanning device over the wireless link. To the application program it appears as if the scanning device is resident on its local hardware. The invention comprises a significant development over previous architectures comprising implementation of a local bar code scanner resident on a machine running a COM object. In particular the architecture of the invention allows control of the scanner through the wireless interface.

By virtue of the present invention there is in addition the capability of supporting future versions to be distributed via the distributed component object model architecture (DCOM). The interfaces between the control container and the control itself are binary and can be implemented by the operating system as Remote Procedure Calls (RPC's). Accordingly the OLE control can be implemented as an Active-X control to control devices over an Internet or Intranet link. This technology allows Web authors and developers to create a new generation of interactive Web pager and applications, for example Microsoft Internet Explorer 3.0 (Trade Mark). This implementation is of particular benefit in proposed systems whereby users will wish to integrate bar code scanning capabilities into their Intranet/Internet-enabled applications.

The Intranet arises from the application of Internet technology to provide industrial strength mission critical applications to users within an organization on an isolated LAN (Local Area Network) rather than for external connection to the global internet. Single function handheld computing terminals can then be built that connects to the LAN and execute predetermined applications to reduce significantly the cost per client when installing a network system. In an Intranet system, mission critical applications reside on the server, eliminating the cost of application deployment and lowering the cost of terminal configuration. The data collected is transmitted and saved on the server so little or no local data storage is needed on the handheld terminal. It will be seen, therefore, that such a system provides an ideal forum for the OLE scanning control object discussed above.

Figure 21:
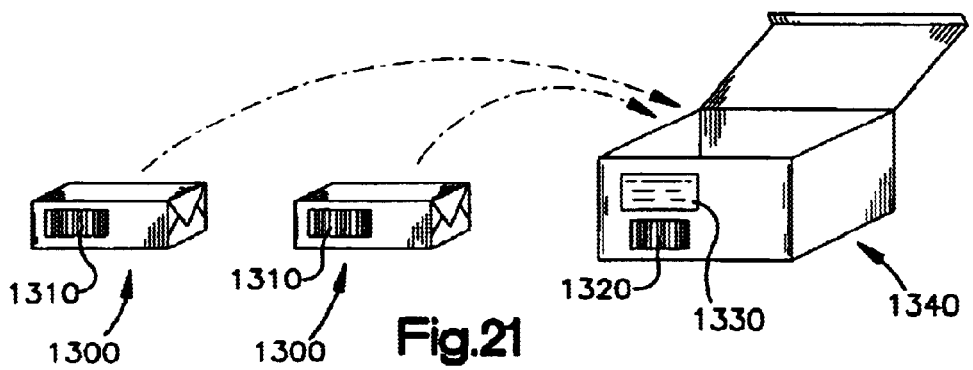
FIG. 21 shows schematically the packaging of the products for shipment according to an embodiment of the present invention.

Referring first to FIG. 21, there is shown a collection of items 1300 which need to be returned to the vendor for a variety of reasons, for example incorrect shipment (wrong color, size item number) damage in transit, to be returned for credit etc. Each item 1300 carries a bar code symbol 1310. The individual items 1300 are to be placed in a container or returns box 1340 in which they will be shipped back to the supplier or vendor.

Figure 23:
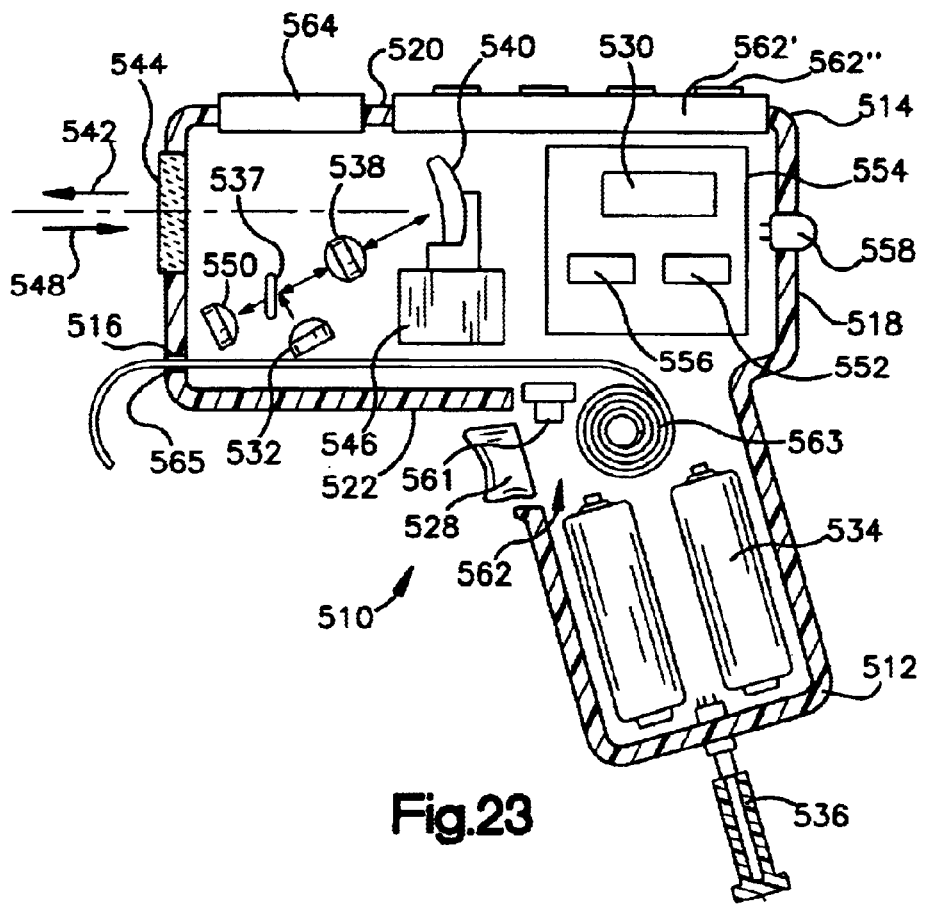
FIG. 23 is a sectional view of a hand-held scanner together with a host computer.
Figure 24:
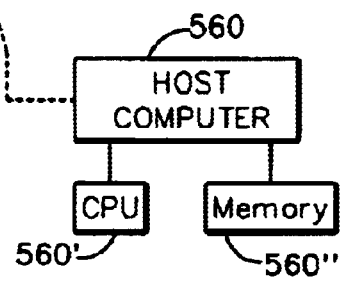
FIG. 24 is a perspective view of the arrangement of FIG. 23 in use.
Figure 24:
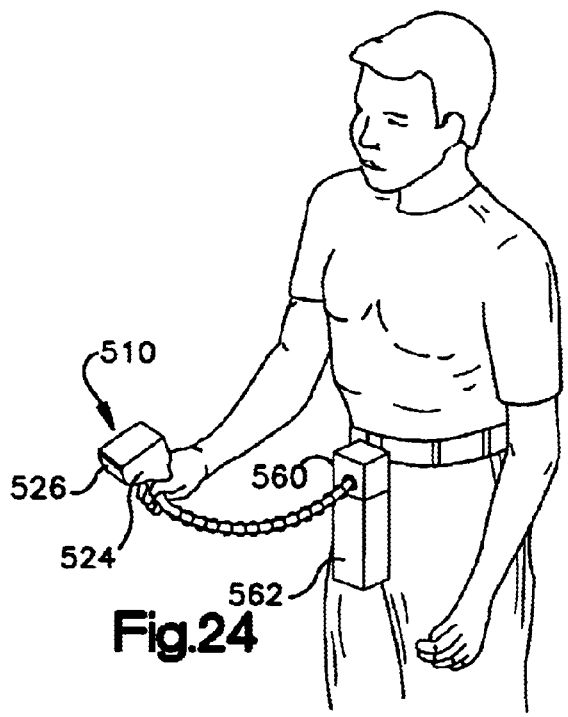

To prepare the package for consignment back to the supplier, the retailer may make use of a bar code scanner having an attached host computer and printer as shown in FIGS. 23 and 24. Alternatively, he may use one of the alternative work station arrangements shown in FIGS. 25 to 26. All of these will be described in more detail below, but for the moment it suffices to note that each bar code scanner incorporates a printer 562, a keyboard 562', 1116 for entering textural information, and a host computer 560 which incorporates a computer memory for storing details of the indicia that have been scanned, and the information entered via the keyboard. The host computer also incorporates a CPU having appropriate software.

Figure 22:
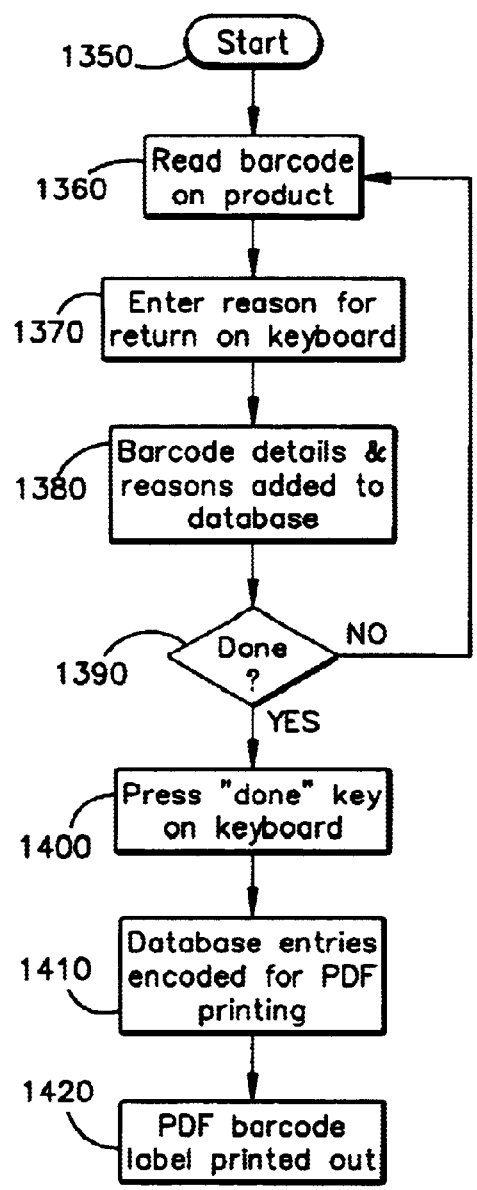
FIG. 22 is a flow diagram illustrating the operation of the software within the scanner.

Details of the method used to prepare the package of products for consignment may be seen from the flow chart of FIG. 22. Starting at step 1350, the retailer first (at step 1360) uses the bar code reader to scan and read the bar code 1310 on the product 1300. He then, at step 1370, enters on the keyboard 562', 1116 the reason for the return, or alternatively as required by the supplier a returns number. At step 1380, the bar code details and the reasons are automatically added to a database maintained within the memory of the host computer 560. It will of course be appreciated that in an alternative embodiment (not shown) the user could be required to enter the details on the keyboard before, rather than after, scanning the bar code symbol. In either case, once the item 1300 has been scanned it is then placed into the large container 1340.

The process continues at step 1390, with steps 1360 to 1380 being repeated if further items are to be shipped. Once the retailer has finished, he presses a "done" key on the keyboard, at step 1400, to advise the host computer that there are no additional items to be added. At step 1410 the host computer 560 than encodes the database entries for PDF printing, and at step 1420 prints out a PDF bar code label. The PDF label, 1320, contains a listing of all the items in the container 1340 and the reasons for their return. The label is preferably self-adhesive, and the vendor merely secures it to the outside of the container before shipping. Alternatively, the printer 562 could print the PDF bar code directly onto the surface of the container 1340. A further label 1330, showing the address of the consignment, may be printed out automatically. The vendor also secures that to the outside of the container. The container can then be shipped.

On receipt of the container, the supplier simply reads the PDF label 1320 to determine which items are in the box, and the reasons for their return. Where the bar code incorporates return codes, the supplier can simply and easily determine whether the retailer has authorization to return those particular products. The label may, in addition, contain encoded information identifying the particular retainer in question.

The bar code symbol 1320 is desirably a PDF symbol, which is automatically produced by the software contained within the host computer 560. Details of the encoding method used by the software, which would enable a skilled man to deviate appropriate software, are described in the above-referenced US patent in common ownership with the present application.

Now that the conceptual aspects of the invention should be clear, reference may be made to FIGS. 23 to 26 which illustrate various exemplary embodiments of the scanner/printer assembly.

Referring first to FIG. 23 of the drawings, reference numeral 510 generally identifies a lightweight (less than 1 lb), narrow bodied, streamlined, hand-held, fully-portable, easy-to-manipulate, non-arm and wrist-fatiguing, scanning head supportable entirely by an operator for use in a scanning system operative for reading, scanning and/or analyzing symbols and aimable, both prior to and during reading thereof, by the operator at the symbol, each symbol in its turn. The term "symbol" as used herein is intended to cover indicia composed of parts having different light-reflective properties. The indicia may be industrial symbols, e.g. Code 30, Codebar, Interleaved 2 or 5, etc., or the omnipresent Universal Product Code (UPC) bar code symbol. The indicia may also be composed of alphabetic and/or numeric characters.

The head 510 includes a generally gun-shaped housing having a handle portion 512 or generally rectangular cross-section, and a generally horizontally-elongated narrow-bodies barrel or body portion 514. The dimensions and overall size of the handle portion 512 are such that the head 510 can conveniently fit and be held in the operator's hand. The body and handle portions are constituted of a lightweight resilient, shock-resistant, self-supporting material such as a synthetic plastic material. The plastic housing is preferably injection-molded and forms a thin, hollow shell whose interior space measures less than a volume on the order of 50 cu.in.

As considered in an intended position of use, as shown in FIG. 24 the body portion 514 has a front wall 516, a rear wall 518 spaced rearwardly of the front wall, a top wall 520, a bottom wall 522 below the top wall, and a pair of opposed side walls 524,526 that lie in mutual parallelism between the top and bottom walls.

A manually-actuable, and preferably depressible, trigger 528 is mounted for pivoting movement about a pivot axis on the head in a forwardly-facing region where the handle and body portions meet and where the operator's forefinger normally lies when the operator grips the handle portion in the intended position of use.

A plurality of components are mounted in the head and, as explained below, at least some of them are actuated by the trigger 528, either directly or indirectly, by means of a control microprocessor 530. One of the head components is an actuable light source e.g. a semiconductor laser diode 532 or a light emitting diode, operative, when actuated by the trigger 528, for propagating and generating an incident light beam. In the case of a laser, the light beam is highly divergent, is non-radially symmetrical, is generally oval in cross-section, and has a wavelength above 7000 Angstrom units. The laser diode 532 requires a low voltage, e.g. 12 volts DC or less, supplied by a battery 534 which may be provided within the handle portion 512 or by a rechargeable battery pack accessory detachably mounted on the head, or by a power conductor in a cable connected to the head from an external power supply.

An optical assembly, including a half-silvered mirror 537 and an optical train 538, is mounted in the head, and is adjustably positioned relative to the diode 532 for optically modifying and directing the incident laser beam along a first optical path toward a reference plane which is located exteriorly of the head forwardly of the front wall 516 and which lies generally perpendicular to the longitudinal direction along which the incident laser beam propagates. A symbol to be read is located at the vicinity of the reference plane, either at, or at one side, or at an opposite side, of the reference plane, that is, anywhere within the depth of focus or field of the optically-modified incident laser beam. The depth of focus or field is also known as the working distance in which the symbols can be read. The incident laser beam reflects off each symbol in many directions, and that portion of the reflected laser light which travels away from the symbol back toward the head is known herein as the returning portion.

The laser beam passing through the optical train 538 impinges on a generally planar portion of a scanning mirror 540 forwardly reflects the laser beam impinging thereon in the direction of an arrow 542 through a forwardly-facing light-transmissive window 544 mounted on the front wall 516 and to the symbol.

The scanning mirror 540 is mounted on a scanning component, preferably a high-spaced scanner motor 546 of the type shown and described in U.S. Pat. No. 4,387,297, the entire contents of which are incorporated herein by reference. For purposes of this application, it is sufficient to point out that the motor 546 has an output shaft on which a support bracket is fixedly mounted. The scanning mirror 540 is fixedly mounted on the bracket and is driven in alternate circumferential directions over art lengths of any desired size, typically less than 360°, and at a rate of speed on the order of a plurality of oscillations per second. In a preferred embodiment, the scanning mirror 540 and the shaft are reciprocally and repetitively oscillated so that the scanning mirror repetitively sweeps the incident laser beam impinging on the mirror through an angular distance or arc length at the reference plane of about 32° and at a rate of about 20 scans or 40 oscillations per second.

The returning portion of the reflected laser light has a variable light intensity due to the different light-reflective properties of the various parts that comprise the symbol over the symbol during the scan. The returning portion of the reflected laser light is collected in the direction of arrow 548 by a generally concave spherical portion of the mirror 540. The generally planar mirror portion is integrally attached to the generally spherical mirror portion of the mirror 540. The spherical portion reflects the collected light through the optical train 538, the half-silvered mirror 537, and to a sensor means, e.g. a photosensor 550. The photosensor 550, preferably a photodiode, detects the variable intensity of the collected laser light over a field of view which extends along, and preferably beyond, the scan and generates an electrical analog signal indicative of the detected variable light intensity.

Also mounted in the head is a signal processing means 552 mounted on a circuit board 554, and operative for processing the analog electrical signal generated by the photodiode 550 into a digitized video signal. Data descriptive of the symbol can be derived from the video signal. Suitable signal processing circuitry for this purpose was described in U.S. Pat. No. 4,251,798. Other components within the head include drive circuitry for the motor 546, an aiming light controller in the event that the laser diode 532 generates a laser beam which is not readily visible to the human eye, and a voltage converter for converting incoming voltage, e.g. from the battery 534, to a regulated voltage suitable for energizing the laser diode 532.

Also mounted on the circuit board 554 is a decode/control means 556 operative for decoding the digitized video signal to a digitized decoded signal from which the desired data descriptive of the symbol is obtained in accordance with an algorithm contained in a software control program in the microprocessor 530. The decode-control means includes a PROM for holding the control program, and an RAM for temporary data storage. The decode/control means 556, together with the micro-processor, determine when a successful decoding of the symbol has been obtained, and also terminates the reading of the symbol upon determination of the successful decoding thereof. The initiation of the reading is caused by depression of the trigger 528. The decode/control means also includes control circuitry for controlling the actuation of the actuatable components in the head, namely, the laser diode 532, the photodiode 550, the motor 546, and all the other electronic subcircuits therein, as initiated by the trigger, as well as for communicating with the user that the reading has been automatically terminated as, for example, by sending a control signal to an indicator lamp 558 to illuminate the same or by energizing a buzzer or beeper.

The decoded signal is either conducted along a conductor within a cable interconnected between the head and a remote host computer 560, or is transmitted by radio wave from the head to the computer 560 by means of antenna 536. The computer 560 serves essentially as a large data base, may be an in-store processor, stores the decoded signal, and provides information related to the decoded signal. It includes a CPU 560' and a memory 560". For example, the host computer, in accordance with this invention, can provide retail price information on an updated basis corresponding to the products identified by their decoded symbols. The host computer can advantageously be incorporated in a portable terminal, or in a stationary terminal such as a cash register.

The data base can be incorporated in a portable housing held in one's other hand, or supported on the operator's person, for example, suspended from a belt or shoulder strap, in a field-portable application.

A keyboard 562' may advantageously be provided on the head for entering data relating to the symbol and/or the product bearing the same. The keyboard includes a "done" key 562" by which the user tells the host computer 60 that there are no more items to be scanned. A display 64 is also conveniently mounted adjacent the keyboard 562' on the top wall 520 of the head, and is operative for displaying information relating to the symbol and/or the product bearing the same.

As described so far, each product 1300 bearing a label imprinted with a symbol 1310 is identified by scanning the symbol with the hand-held scanner head 510 in the manner depicted in FIG. 24.

The printing of the PDF code symbol 1320 is performed by a printer 562 that is either incorporated in the hand-held head 510 (see FIG. 21) or held in one's other hand, or worn on one's person (see FIG. 22), or mounted on a nearby support surface such as a countertop, or incorporated in another component such as a scale or cash register, as described below. The printer includes a thermal printhead 561 operative for thermally imprinting graphical markings on a journaled roll 563 of paper labels, each print label being torn off the roll by being urged against tear-off edge 565 at the front of the head 510. The label preferably has a pressure-adhesive backing so that it can be applied directly on the container 340.

Figure 25:
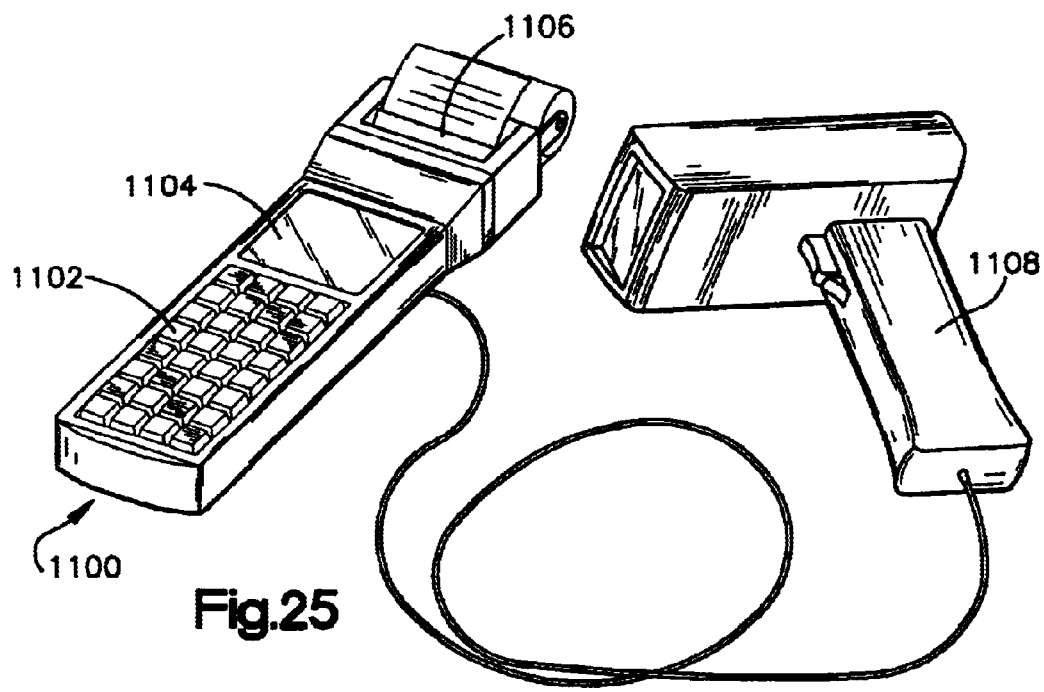
FIG. 25 shows a printer/scanner assembly suitable for use with the present invention.

FIG. 25 illustrates an alternative printer/scanner arrangement which can be used with the present invention. The assembly comprises a portable data terminal 1100 having a keyboard 1102 for data entry, and a screen 1104. Attached to the portable data terminal are an integrated printer 1106 and a separate bar code reader 1108.

Figure 26:
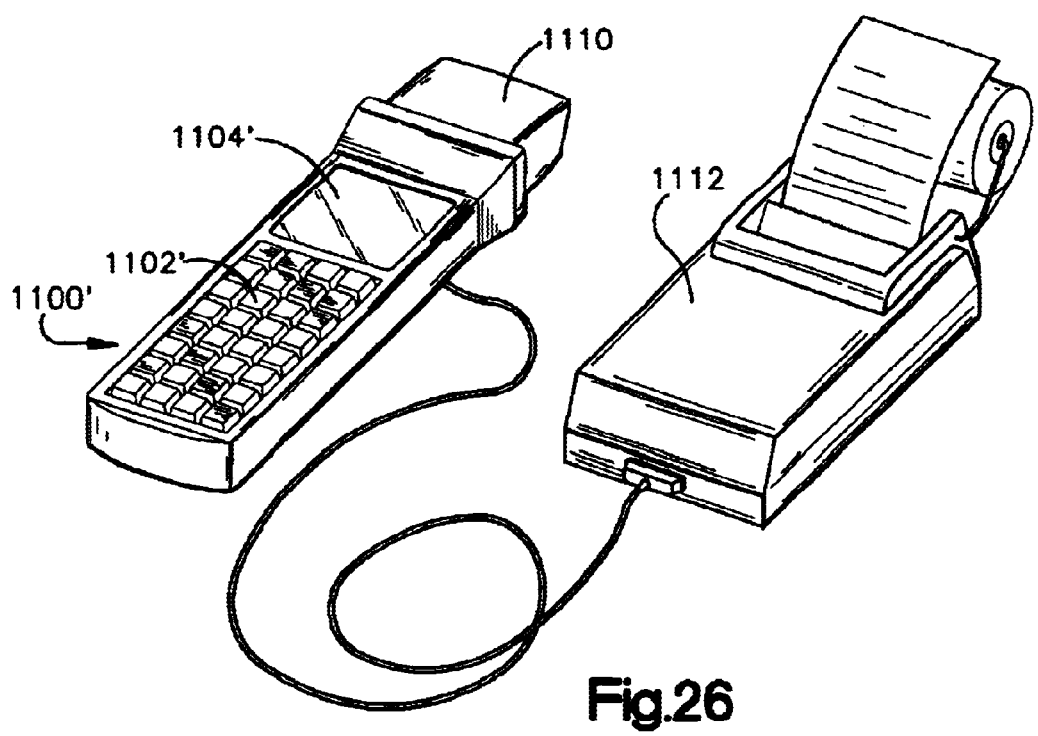
FIG. 26 shows a further printer/scanner assembly.

An alternative printer/scanner arrangement is shown in FIG. 26. As before, this comprises a portable data terminal 1100', having a keyboard 1102', and a screen 1104'. However, in this case the terminal incorporates an integral scanner head 1110. Attached to the terminal is a separate printer 1112.

It will be appreciated that the various different aspects presented herein can be combined or interchanged as appropriate. For example the "return to vendor" method described above in relation to FIGS. 21 to 26 may be carried out using a suitably configured optical reader of the type described with reference to FIGS. 1 to 8.

Many other embodiments of the invention are within the scope of the following claims:

What is claimed is:

1. A wireless user-held network terminal for accessing, displaying, and entering data on a computer network, the terminal comprising:
   a processor and associated memory;
   a visual display;
   a keypad;
   a radio transmitter and receiver configured to establish wireless communication between the terminal and the computer network;
   communications engine software for controlling communication between the wireless terminal and the computer network; and
   parsing software for providing a user interface on the display by parsing script received from the network, whereby a multiplicity of different user interfaces may be provided without installing new software on the wireless terminal.

2. The terminal of claim 1 wherein the terminal is configured to be hand-held.

3. The terminal of claim 1 wherein the terminal comprises a personal digital assistant.

4. The terminal of claim 1 wherein the computer network is the Internet.

5. The terminal of claim 1 wherein the script comprises markup language.

6. The terminal of claim 5 wherein the script comprises HTML.

7. The terminal of claim 1 further comprising a bar code scanner and bar code acquisition engine software for scanning and decoding bar code labels.

8. The terminal of claim 7 wherein the terminal is configured to obtain a script from a bar code label, wherein the user interface on the display of the terminal is prescribed by a bar code label scanned using the terminal.

9. The terminal of claim 8 wherein the bar code label provides the network address of the script.

10. The terminal of claim 8 wherein the bar code label provides the script.

11. The terminal of claim 1 further comprising a browser which comprises the parsing engine software.

12. The method of claim 1 wherein the wireless communication is across cellular telephone channels.

13. A wireless user-held network terminal for accessing markup language files on the Internet, the terminal comprising:
- a processor and associated memory;
- a visual display;
- a keypad;
- a radio transmitter and receiver configured to establish wireless communication between the terminal and the computer network;
- communications engine software for controlling communication between the wireless terminal and the Internet; and
- browsing software for accessing and parsing the markup language files.

14. The terminal of claim 13 wherein the markup language is HTML.

15. The terminal of claim 7 wherein the bar code scanner is configured to read high density bar code labels.

16. A wireless user-held bar code scanning terminal for scanning bar code labels and accessing files on a computer network, the terminal comprising:
- a processor and associated memory;
- a visual display;
- a keypad;
- a radio transmitter and receiver configured to establish wireless communication between the terminal and the computer network;
- communications engine software for controlling communication between the wireless terminal and the computer network;
- parsing software for providing a user interface on the display by parsing script received from the network, whereby a multiplicity of different user interfaces may be provided without installing new software on the wireless terminal;
- a bar code scanner; and
- a bar code acquisition engine software for scanning and decoding bar code labels scanned by the bar code scanner.

17. The terminal of claim 16 wherein the terminal is configured to obtain a script from a bar code label, wherein the user interface on the display of the terminal is prescribed by a bar code label scanned using the terminal.

18. The terminal of claim 17 wherein the bar code label provides the network address of the script.

19. The terminal of claim 17 wherein the bar code label provides the script.

20. The terminal of claim 16 wherein the terminal is configured to be hand-held.

21. The terminal of claim 16 wherein the terminal comprises a personal digital assistant.

22. The terminal of claim 16 wherein the computer network is the Internet.

23. The terminal of claim 16 wherein the script comprises markup language.

24. The terminal of claim 23 wherein the script comprises HTML.

25. The terminal of claim 16 further comprising a browser which comprises the parsing engine software.

26. A method of remotely browsing, on a user-held wireless computer device, and electronic document stored as a file having a file address on a computer network, the method comprising the steps of:
- using a bar code scanner incorporated into the device to scan a bar code label containing information identifying the file address:
- decoding the file address from the result of the scan;
- accessing the network file by sending the file address over a wireless communication path connecting the device to the computer network; and
- displaying the accessed file on a visual display incorporated into the device.

27. The method of claim 26 further comprising entering information at the wireless computer device using a keypad incorporated into the device.

28. The method of claim 26 wherein the filed accessed from the computer network contains script, and the method further comprises running parsing software at the computer device to parse the script received from the computer network.

29. The method of claim 26 wherein the computer device is configured to be hand held.

30. The method of claim 26 wherein the computer device comprises a personal digital assistant.

31. The method of claim 26 wherein the computer network is the Internet.

32. The method of claim 26 wherein the wireless communication is across cellular telephone channels.

33. The method of claim 28 wherein the script comprises a markup language.

34. The method of claim 33 wherein the script comprises HTML.

35. The method of claim 28 further comprising running browser software on the computer device, wherein the browser software comprises the parsing software.

* * * * *